United States Patent
Ju et al.

(10) Patent No.: US 9,860,411 B2
(45) Date of Patent: Jan. 2, 2018

(54) MOBILE TERMINAL AND METHOD OF CONTROLLING THE SAME

(71) Applicant: LG ELECTRONICS INC., Seoul (KR)

(72) Inventors: Wanho Ju, Seoul (KR); Youngjun Lee, Seoul (KR); Seonhwi Cho, Seoul (KR); Donghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/058,732

(22) Filed: Mar. 2, 2016

(65) Prior Publication Data

US 2017/0134605 A1 May 11, 2017

(30) Foreign Application Priority Data

Nov. 10, 2015 (KR) .................. 10-2015-0157692

(51) Int. Cl.
| | |
|---|---|
| *H04N 1/21* | (2006.01) |
| *H04N 5/232* | (2006.01) |
| *G06F 3/0484* | (2013.01) |
| *G06F 3/0488* | (2013.01) |

(Continued)

(52) U.S. Cl.
CPC ........... *H04N 1/2125* (2013.01); *G06F 3/048* (2013.01); *G06F 3/0488* (2013.01); *G06F 3/04817* (2013.01); *G06F 3/04845* (2013.01); *H04N 5/232* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | |
|---|---|---|
| 2008/0012954 A1 | 1/2008 | Sasaki et al. |
| 2010/0194983 A1 | 8/2010 | Terashima |
| 2011/0119619 A1 | 5/2011 | Fong et al. |

(Continued)

FOREIGN PATENT DOCUMENTS

| | | |
|---|---|---|
| EP | 2793462 A1 | 10/2014 |
| KR | 10-2015-0094355 A | 8/2015 |

OTHER PUBLICATIONS

Mobiscrub, "Galaxy S4 mini camera review," Aug. 10, 2013, 1 page, XP054977218, https://www.youtube.com/watch?v=KYKOydw8QT8.

(Continued)

*Primary Examiner* — James Hannett
(74) *Attorney, Agent, or Firm* — Birch, Stewart, Kolasch & Birch, LLP

(57) ABSTRACT

A mobile terminal including a camera; a touch screen configured to continuously display images captured by the camera; a memory; and a controller configured to in response to a first touch applied to the touch screen continuously displaying the images at a first touch-applied time point, store a first image displayed on the touch screen at the first touch-applied time point in the memory, display a first thumbnail image corresponding to the first image on the touch screen, in response to a second touch applied to the touch screen continuously displaying the images at a second touch-applied time point, store a second image displayed on the touch screen at the second touch-applied time point in the memory, by grouping the second image with the first image in the memory.

20 Claims, 28 Drawing Sheets

(51) Int. Cl.
*G06F 3/0481* (2013.01)
*G06F 3/048* (2013.01)

(56) References Cited

U.S. PATENT DOCUMENTS

| | | | |
|---|---|---|---|
| 2011/0205435 A1* | 8/2011 | Lee | H04N 5/44543 |
| | | | 348/563 |
| 2014/0018053 A1* | 1/2014 | Cho | G06F 3/0488 |
| | | | 455/418 |
| 2014/0226053 A1 | 8/2014 | Winer et al. | |
| 2014/0365893 A1 | 12/2014 | Gao et al. | |
| 2015/0015763 A1 | 1/2015 | Lee et al. | |
| 2015/0058754 A1* | 2/2015 | Rauh | G06F 3/0482 |
| | | | 715/753 |
| 2015/0082168 A1 | 3/2015 | Brieussel | |
| 2015/0312482 A1 | 10/2015 | Tuomaala et al. | |
| 2016/0295130 A1* | 10/2016 | Molgaard | H04N 1/215 |
| 2016/0360116 A1* | 12/2016 | Penha | G06F 3/0487 |
| 2017/0064208 A1* | 3/2017 | Salimpour | H04N 5/23293 |

OTHER PUBLICATIONS

Scattershot, "Still Capture Enabler 2 Cydia Tweak (Allows to Take Pictures While Recording Video)," Mar. 1, 2013, 1 page, XP054977219, https://www.youtube.com/watch?v=elBTkQQzSF8.
Story, "Building better slideshows on your iPad," Macworld, May 29, 2013, XP055377807, http://www.macworld.com/article/2039291/building-better-slideshows-on-your-ipad.html, pp. 1-3 (17 pages total)

\* cited by examiner

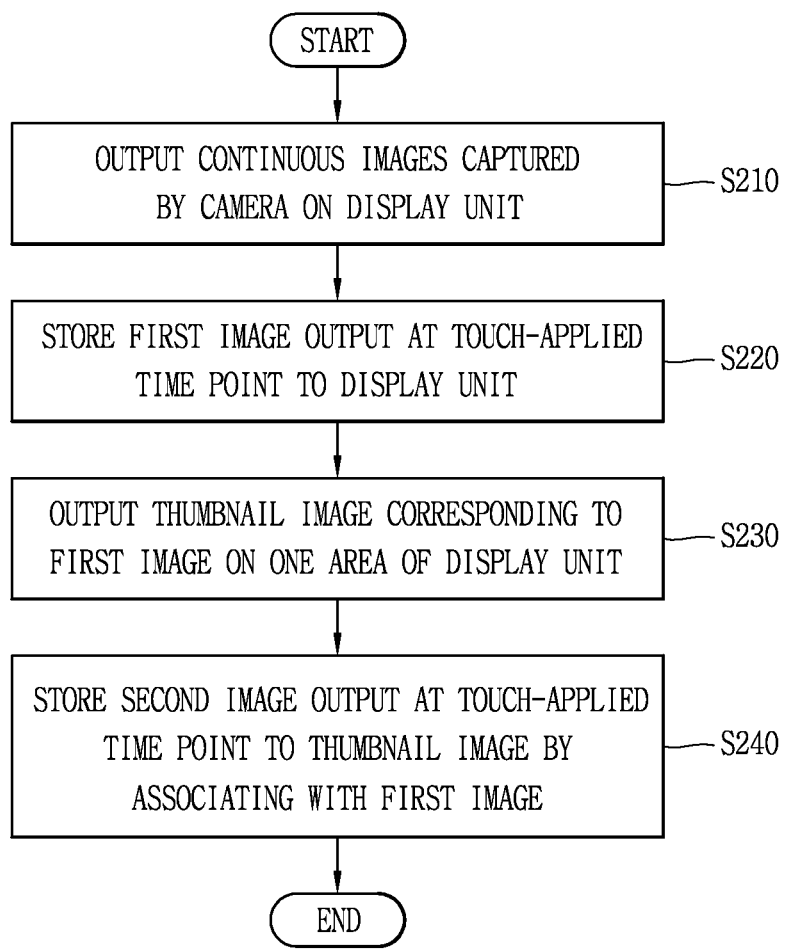

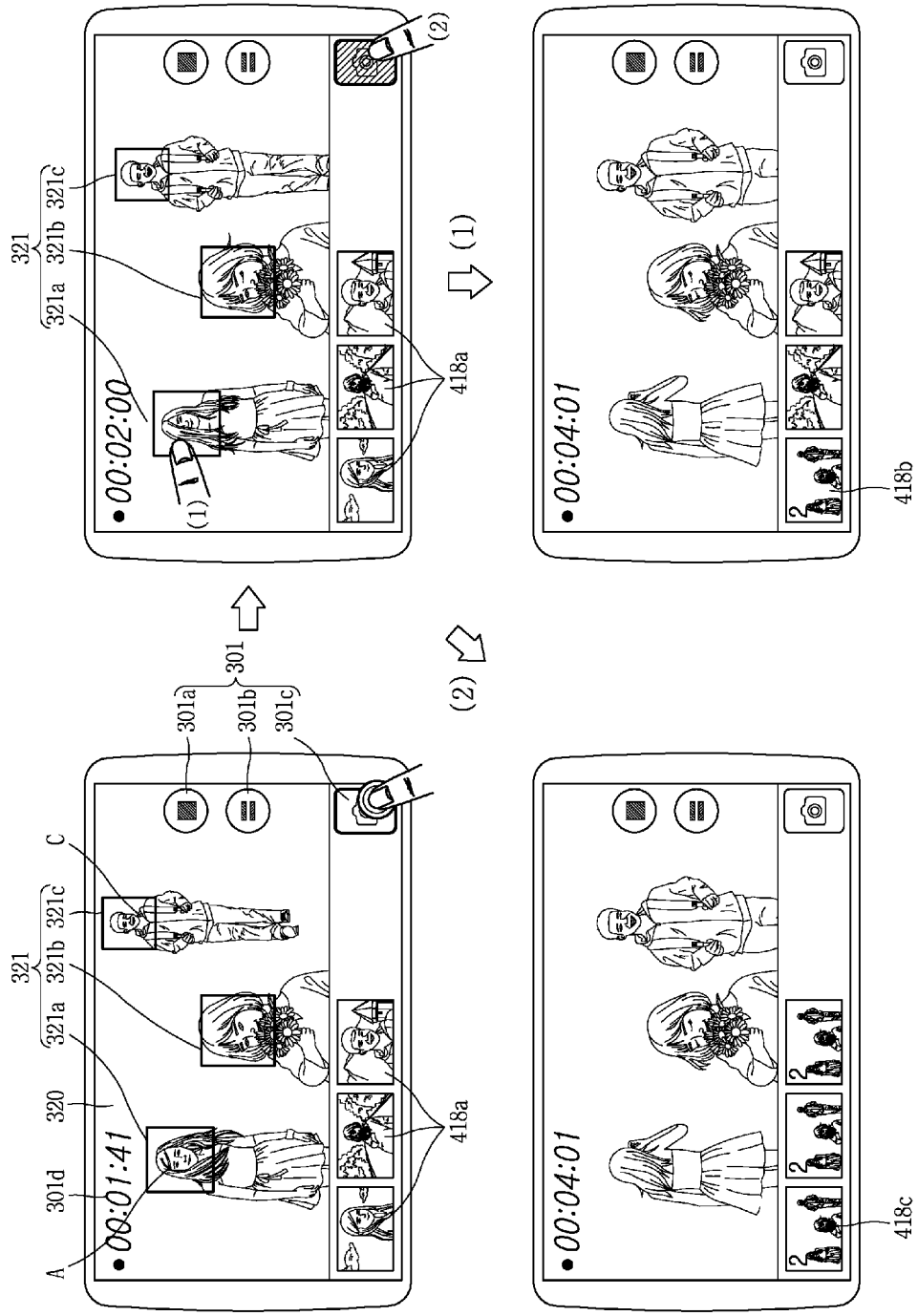

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2015-0157692, filed on Nov. 10, 2015, the contents of which is incorporated by reference herein in its entirety.

BACKGROUND OF THE INVENTION

1. Field of the Invention

This specification relates to a mobile terminal capable of capturing a video and storing images.

2. Background of the Invention

A mobile terminal can record and reproduce videos, and display graphic user interfaces (GUIs) for operating the different functions of the terminal. Also, mobile terminals include notebook computers, cellular phones, glasses and watches capable of displaying screen information, game machines and the like.

As it becomes multifunctional, a mobile terminal can capture still or moving images, play music or video files, play games, receive broadcast sand the like, so as to be implemented as an integrated multimedia player. Many efforts include not only changes and improvement of structural components implementing a mobile terminal, but also software improvement to support and improve functions of the terminal.

In recent time, as a camera installed in a mobile terminal exhibits an improved performance and the users' needs increase according to functions of the camera, various functions of capturing videos and images are under development. However, when a large amount of images is captured, specifically, when images included in a video are separately stored, an additional task of grouping those images is inconveniently required.

SUMMARY OF THE INVENTION

Therefore, on object of the present invention is to address the above-noted and other problems with the related art.

Another object of the present invention is to provide a method of storing images in a classifying manner during capturing of a video.

To achieve these and other advantages and in accordance with the purpose of this specification, as embodied and broadly described herein, the present invention provides in one aspect, a mobile terminal including a camera; a touch screen configured to continuously display images captured by the camera; a memory; and a controller configured to in response to a first touch applied to the touch screen continuously displaying the images at a first touch-applied time point, store a first image displayed on the touch screen at the first touch-applied time point in the memory, display a first thumbnail image corresponding to the first image on the touch screen, and in response to a second touch applied to the touch screen continuously displaying the images at a second touch-applied time point, store a second image displayed on the touch screen at the second touch-applied time point in the memory, by grouping the second image with the first image in the memory.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 2A is a flowchart illustrating a method for controlling a mobile terminal in accordance with one embodiment of the present invention;

FIGS. 4A to 4D are conceptual views illustrating a control method of storing images in a categorizing manner when discriminative subjects are sensed;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
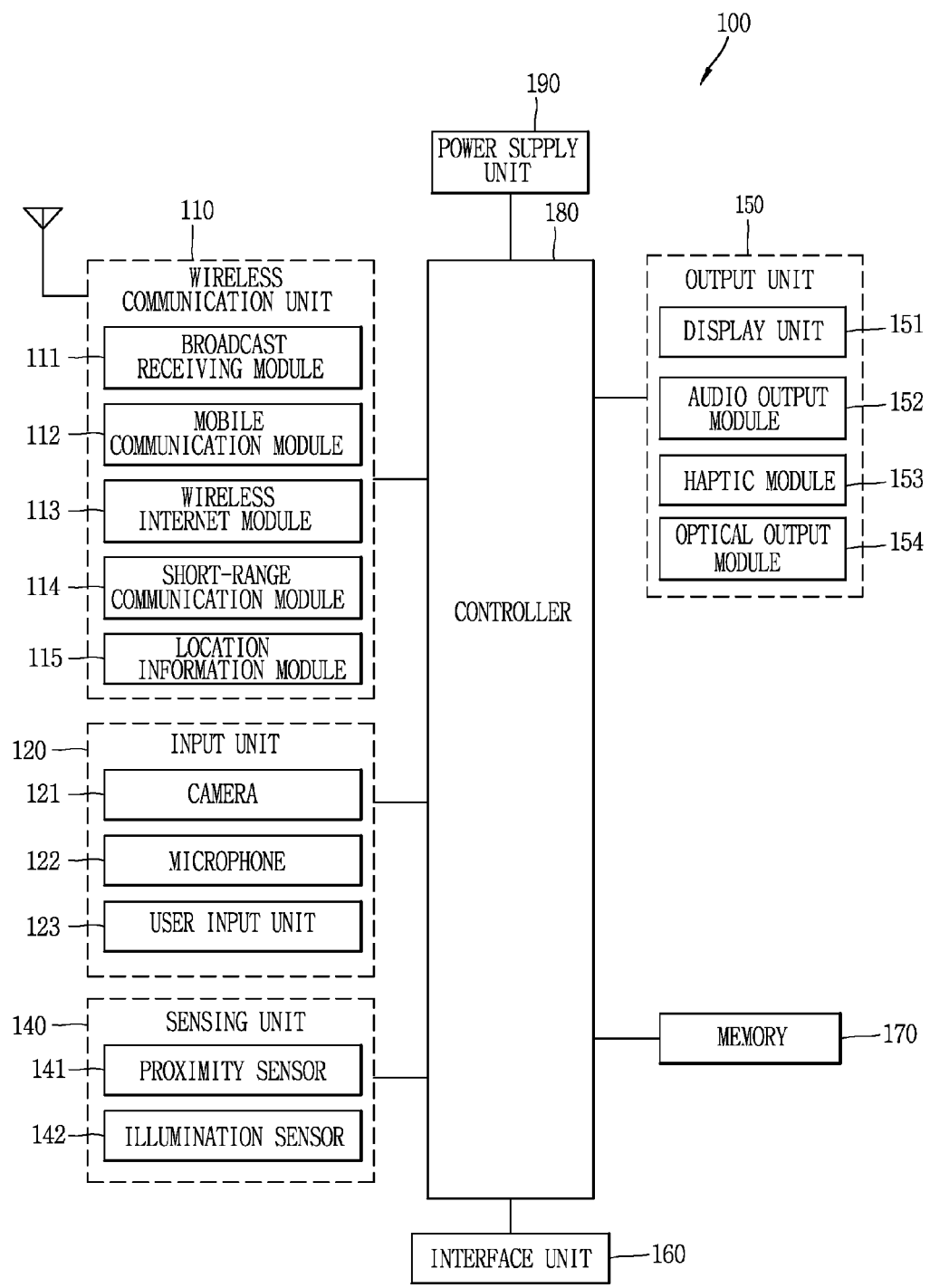
FIG. 1A is a block diagram of a mobile terminal according to an embodiment of embodiment the present invention.
Figure 1B:
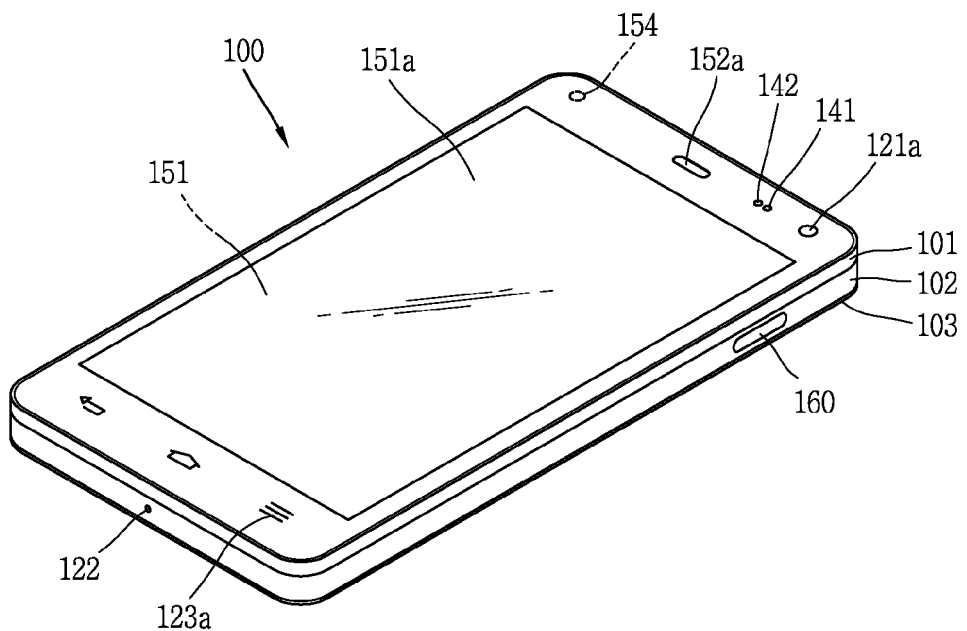
FIGS. 1B and 1C are conceptual views illustrating one example of a mobile terminal, viewed from different directions.
Figure 1C:
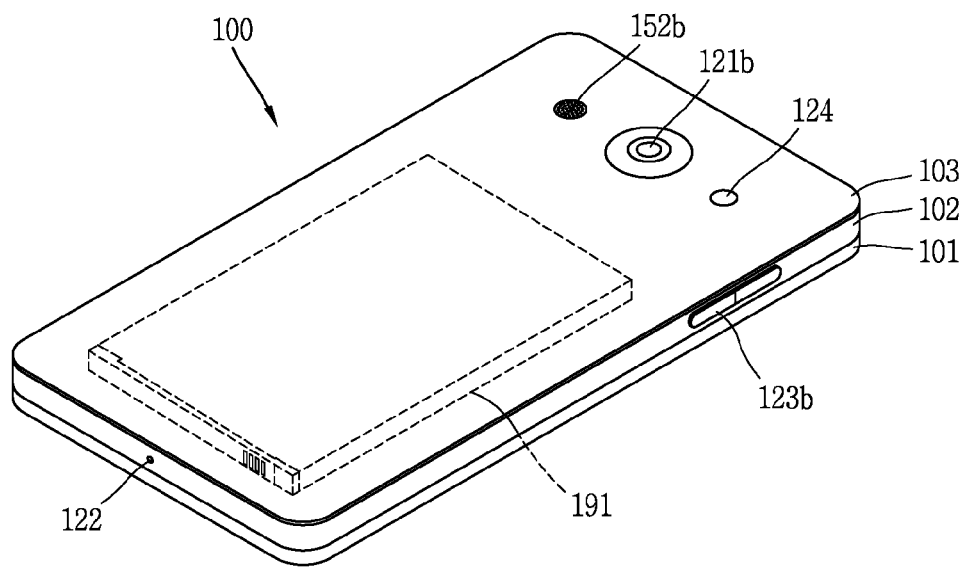

Referring to FIGS. 1A to 1C, FIG. 1A is a block diagram of a mobile terminal in accordance with one embodiment of the present invention, and FIGS. 1B and 1C are conceptual views illustrating one example of a mobile terminal, viewed from different directions. The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that has been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and is not limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In addition, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In addition, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor Implementing the camera 121 with a laser sensor may allow detection of a touch of a physical object with respect to a 3D stereoscopic image. The photo sensor may be laminated on, or overlapped by, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components are not limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit a touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

As shown in FIG. 1C, the second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2B:
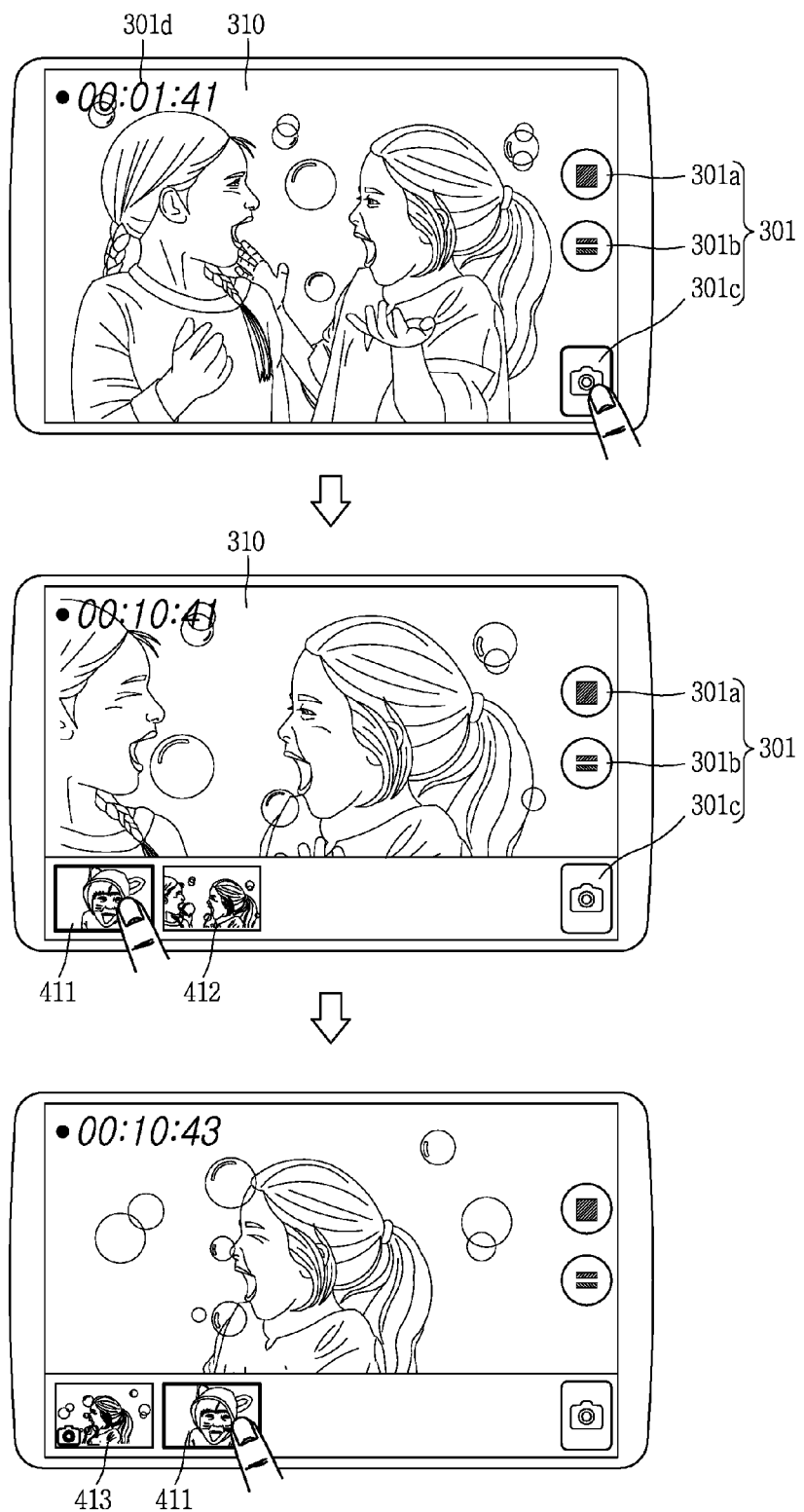
FIGS. 2B to 2C are conceptual view illustrating the control method of FIG. 2A.
Figure 2C:
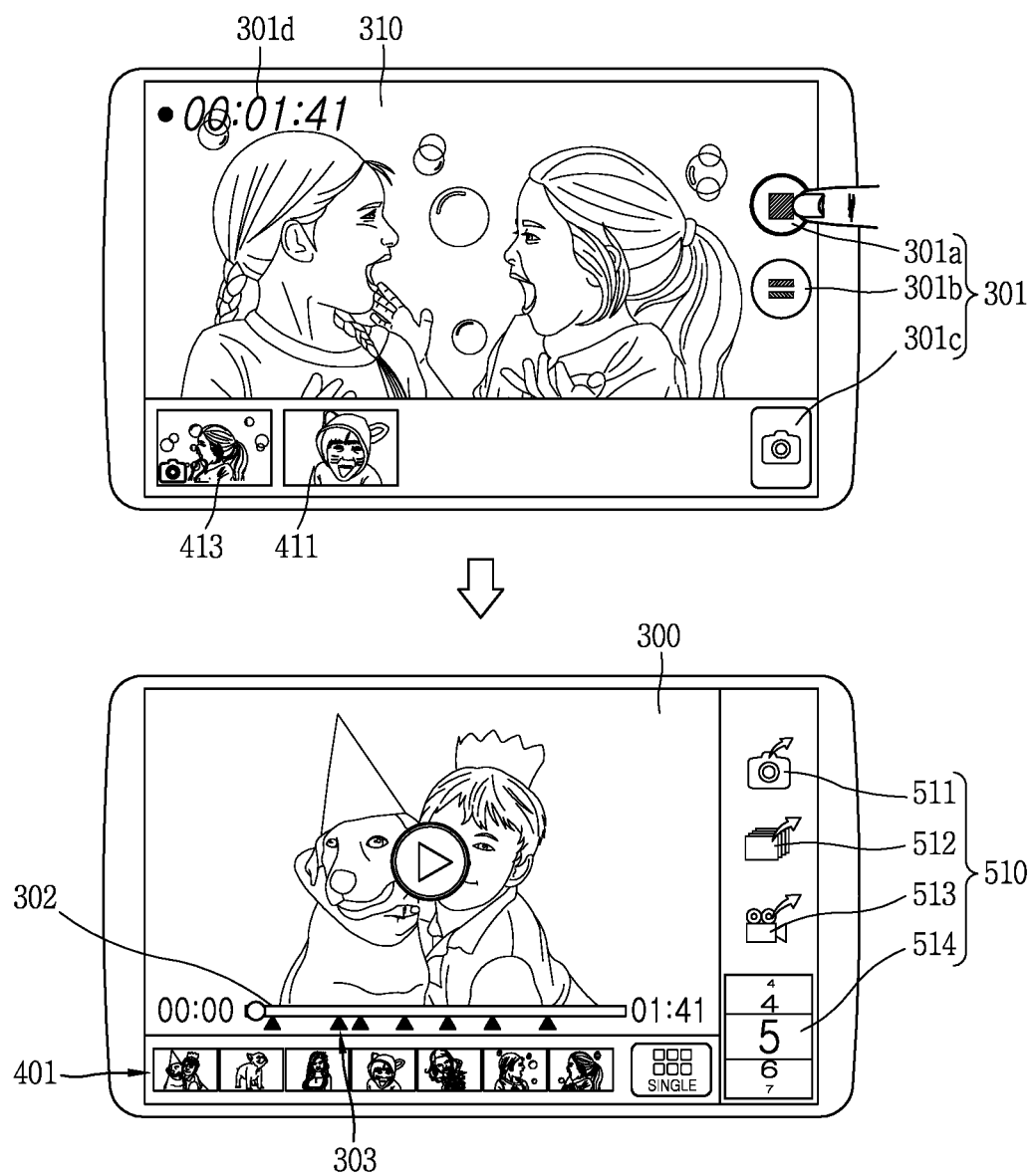

Next, FIG. 2A is a flowchart illustrating a method for controlling a mobile terminal in accordance with one embodiment of the present invention, and FIGS. 2B to 2C are conceptual views illustrating the control method of FIG. 2A. As illustrated in FIGS. 2A and 2B, the controller 180 can output continuous images captured by the camera 121 on the display unit 151 (S210). In particular, the controller 180 can execute a video capturing function when a control command for video capturing is applied, and continuously output images obtained by the camera 121 on the display unit 151. Since the continuous images output on the display unit 151 construct a video file, a user can check or view those images constructing the video file on the display unit 151 in real time.

In addition, the continuous images may correspond to visual information, namely, preview images, which are obtained by the camera 121 before a control command for image capturing and video capturing is applied after the camera 121 is activated. The controller 180 can also control the memory 170 to temporarily store images 310 obtained after the control command is applied, and generate (or form) a video file using the images 310. In more detail, the controller 180 can generate a video file using a plurality of images, which are captured until a time point of receiving a stop command applied for stopping the video capturing.

When the video capturing function is executed, the display unit 151 displays a control icon 301 for controlling the video capturing function on the images 310 obtained by the camera. As shown, the control icon 301 can include a first icon 301a for stopping the video capturing and generating a video file, a second icon 301b for pausing the video capturing, and a third icon 301c for storing images output on the display unit 151.

The controller 180 can also display a capture time 301d indicating an executed time of the video capturing function on one area of the display unit 151. The capture time 301d may not change when a touch is applied to the second icon 301b. In this instance, the display unit 151 can continuously output a preview image obtained by the camera 121.

Further, the controller 180 can store a first image output on the display unit 151 at a time point that a touch is applied to the display unit 151 (S220). The first image corresponds to an image obtained by the camera 121 and output on the display unit 151 at the touch-applied time point. The first image also corresponds to one image included in the video file.

Here, the touch applied to the display unit 151 may be applied on an image output on the display unit 151 or the third icon 301c. The controller 180 can also store the first image in the memory 170, in response to the touch. In another example, the controller 180 can store images obtained by the camera 121 according to a lapse of time, irrespective of the touch applied.

In addition, the controller 180 can display a thumbnail image 411 corresponding to the first image on one area of the display unit 151, in response to the touch (S230). The display unit 151 can also continue to display an image obtained by the camera in real time, along with the thumbnail image 411. In more detail, the controller 180 can store an additional image in the memory 170, in response to a touch applied to the display unit 151. In this instance, the controller 180 can display a second thumbnail image 412 corresponding to the additional image adjacent to the first thumbnail image 411. That is, the user can store images obtained by the camera during video capturing in the memory 170, in response to the touch, independent of a stored video file.

Further, the controller 180 can store a second image in the memory 170, which is output at a time point that a touch is applied to the thumbnail image, in association with the first image. For example, the first and second images may be included in the same folder, so as to be discriminated from a folder in which the video file is stored.

In addition, the display unit 151 can display a third thumbnail image 413 corresponding to the second image and display a number (2) of associated stored images on the third thumbnail image 413. Similarly, when a touch is additionally applied to the third thumbnail image 413, three images may be stored in one category in an associating manner.

Further, FIG. 2B illustrates that a thumbnail image of the most recently-stored image is displayed on the display unit 151, in response to a touch applied to the thumbnail image, but the present invention is not limited to this. For example, when there is a stored image in association with an image of one thumbnail image, an image in a laminated (layered) shape with the thumbnail image can be displayed or a thumbnail image of the earliest-stored image may continuously be displayed.

In this embodiment, the user can independently store one image by applying a touch while capturing a video, and store a plurality of images in an associating manner by applying touches onto thumbnail images of the stored images. Accordingly, the user can store the plurality of images obtained during the video capturing by grouping the plurality of images. Since the plurality of images can be discriminatively stored in different categories during video capturing, the user does not have to perform a process of grouping the plurality of images.

Next, FIG. 2C is a conceptual view illustrating a control method when the video capturing is terminated. When a touch is applied to the first icon 301a, the controller 180 can terminate (stop) the video capturing function. That is, the controller 180 can control the camera 121 to be turned off, or control the display unit 151 to just continuously output images obtained by the camera 121 but not record the images.

Further, when the touch is applied to the first icon 301a, the controller 180 can generate a video file using the plurality of images obtained. In particular, the display unit 151 can output a preview screen 300 corresponding to one image of the video file. The preview screen 300 may also include a graphic image for receiving a touch to play (reproduce) the video file, a progress bar 302 for indicating a reproduction duration of the video file, storage points 303 each indicating a stored time of the images along with the progress bar 302 while the capturing function is executed, and thumbnail images 401 corresponding to the stored images.

In addition, a number of the storage points 303 may be substantially the same as a number of the stored images. Thus, the storage points 303 allow the user to recognize stored time points of images within the reproduction duration of the video file, and a number of images stored along with the video file.

Further, the thumbnail images 401 may be arranged according to a lapse of stored time. In the drawing, the plurality of thumbnail images 401 are arranged in series to be adjacent to one another, along the lapse of their stored time. However, the output method of the thumbnail images is not limited to this. The thumbnail images 401 can also be output in an overlapping manner or in a spaced manner according to the stored time.

In addition, when the video file is generated, the display unit 151 can output a control image 510 for controlling the video file and images. For example, the control image 510 can include a first control icon 511 for sharing a stored image, a second control icon 512 for sharing information regarding a selected frame of the video, and a third control icon 513 for sharing a video of a selected frame. The user can thus selectively share at least part of the stored video file and the stored images. Here, the sharing may be performed by transmitting information to a specific server or a specific external device using the wireless communication unit 110.

In addition, the control image 510 may include a fourth control icon 514 for adjusting an output duration or output period of time (seconds) of the selected frame. Here, the output duration may correspond to a reproduction frame (playback frame) of a video file, which is selected based on a stored image. For example, when one image is selected and an output duration is set to 5 seconds, a video reproduction frame for 5 seconds before and after the selected image can be used.

In addition, the fourth control icon 514 can be configured to allow for a time adjustment (or duration adjustment) in response to a drag touch applied thereto in one direction, but the present invention is not limited to this. In accordance with this embodiment, when a video file is generated, a user can share the video file and images or select part of the video file and images.

Figure 3A:
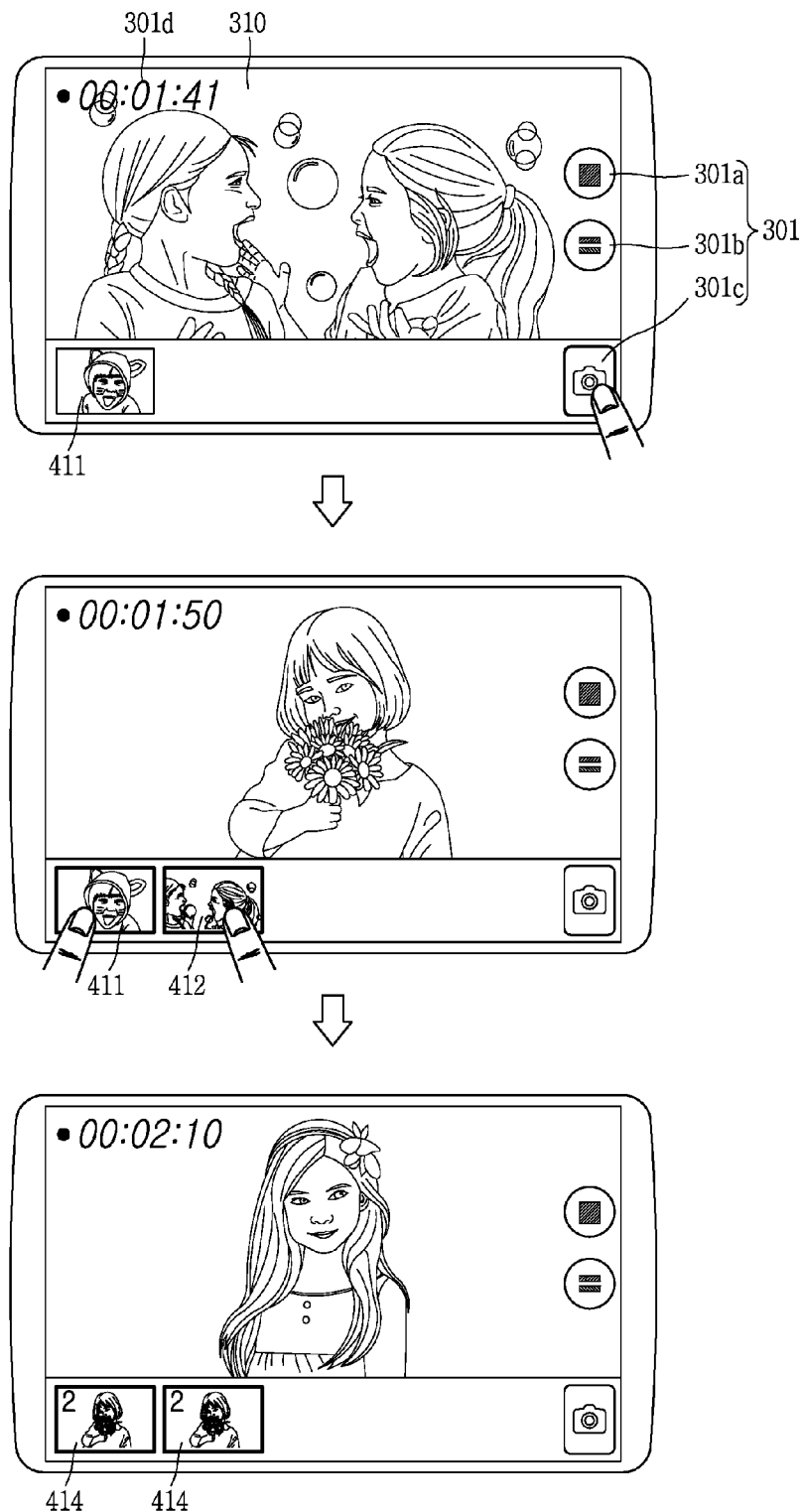
FIGS. 3A and 3B are conceptual views illustrating a control method of storing images during video capturing in accordance with one embodiment of the present invention.
Figure 3B:
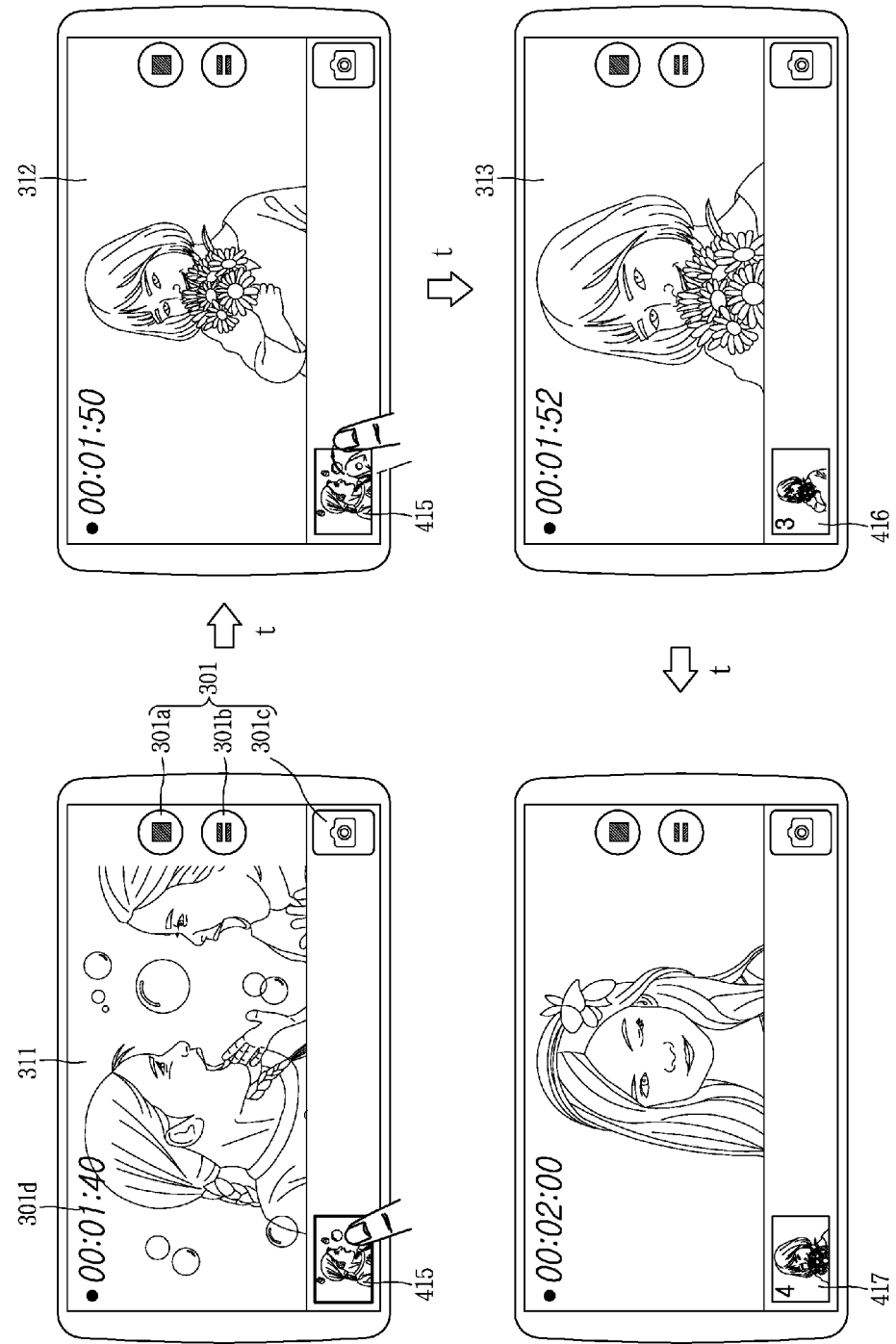

Next, FIGS. 3A and 3B are conceptual views illustrating a control method of storing images during video capturing in accordance with one embodiment disclosed herein. As illustrated in FIG. 3A, the display unit 151 can display the image 310 obtained by the camera 121, the control icon 301 and the capture time 301d while a video capturing function is performed. When a touch is applied to the image 310 or the third icon 301c, the controller 180 can store one image forming (constructing) a video file and display a first thumbnail image 411 corresponding to the one image in the display unit 151.

In addition, when a touch is applied to the third icon 301c, the controller 180 can store an image which is output on the display unit 151 at the touch-applied time point and output a second thumbnail image 412. In response to a specific touch input simultaneously applied to the first and second thumbnail images 411 and 412, the controller 180 can store an image output at the touch-applied time point in the memory 170. Further, the specific touch input may correspond to a multi-touch input simultaneously applied to different areas on the display unit 151.

Thus, two images which are substantially the same as each other may be stored in association or grouped with each of the first and second thumbnail images 411 and 412. When the images are stored, the display unit 151 can convert the first and second thumbnail images 411 and 412 into a fourth thumbnail image 414 corresponding to the stored images, and display the number (2) of the associated images on the fourth thumbnail image 414.

In accordance with this embodiment, the user can store one image by being associated with a plurality of prestored images, by applying a touch input to a plurality of thumbnail images. Thus, the user does not have to copy an image after capturing a video in order to store the same image in a plurality of categories, and the like. As illustrated in FIG. 3B, the controller 180 can store images at preset time intervals in the memory 170, in response to a specific touch input applied to the thumbnail image.

In addition, the display unit 151 can output a fifth thumbnail image 415 corresponding to a first image stored, in response to a touch applied while the video capturing function is performed. Then, in response to a touch input applied to the fifth thumbnail image 415, the controller 180 can store an image output on the display unit 151 at the touch-applied time point and display a thumbnail image corresponding to the stored image.

In addition, as illustrated in FIG. 3B, the controller 180 can detect a touch-applied time duration to the fifth thumbnail image 415. Here, the touch may correspond to a long touch input which is maintained for a predetermined period of time. That is, the controller 180 can detect a specific period of time "t" for which an initially-applied touch input to the fifth thumbnail image 415 is maintained. When the touch is released, the controller 180 can store a first image 311 output on the display unit 151 at the time point that the initial touch input is applied, and an image output on the display unit 151 at a time point that the touch input is released. The display unit 151 can output a sixth thumbnail image 416 corresponding to a second image 312 which is the most recently stored image.

Further, the controller 180 can store a third image 313 in the memory 170 and display a seventh thumbnail image 417 corresponding to the third image 313 after a lapse of the specific period of time "t" from the touch-released time point. In accordance with this embodiment, a time of a touch applied to a thumbnail image can be stored, and images displayed on the display unit 151 at an interval corresponding to the time can be regularly stored. In addition, the regularly-stored images can be stored in association with an image corresponding to an initial thumbnail image to which the touch has been applied for the specific period of time.

In addition, while the images are stored at the time interval, an additional image may be stored, in response to a touch applied to one area of the display unit 151. In accordance with this embodiment, images can be stored at specific time intervals without a user's additional control command during video capturing.

Figure 4A:
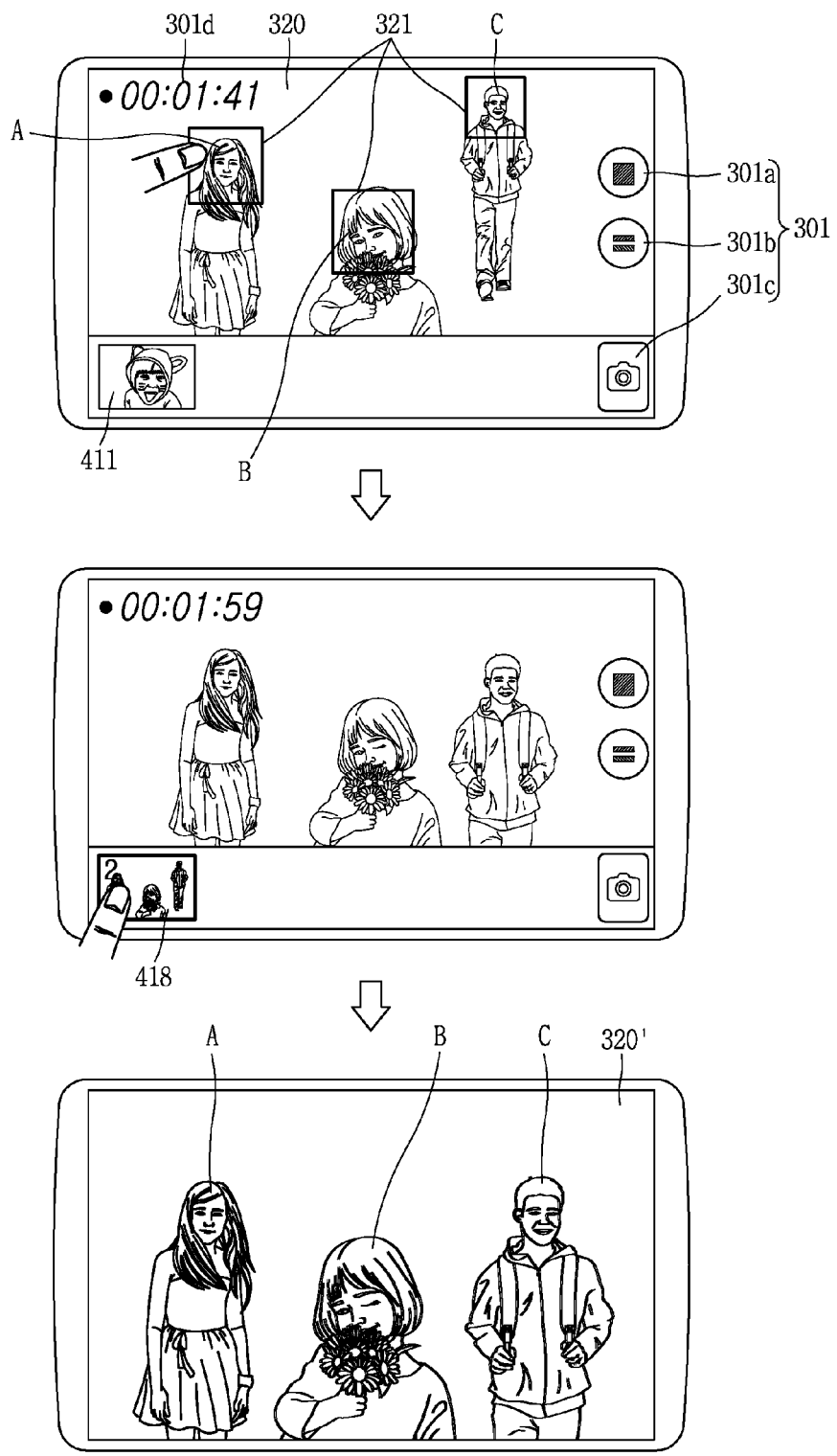

Next, FIGS. 4A to 4D are conceptual views illustrating a control method of storing images in a grouping manner when distinguishable subjects are sensed. As illustrated in FIG. 4A, when first to third subjects A, B and C are detected by the camera 121, the display unit 151 can display guide images 321 indicating the first to third subjects A, B and C, respectively, on an image 320 obtained by the camera 121. The controller 180 can also discriminate (recognize) the first to third subjects A, B and C as different objects, based on faces or the like of the first to third subjects A, B and C.

Further, the controller 180 can store an image and display a first thumbnail image 411 on the display unit 151, in response to a touch applied thereto, while the video capturing function is performed. When a touch is applied to the guide image 321 corresponding to the first subject A, the controller 180 can store an image displayed on the display unit 151 at the touch-applied time point. Also, the image can be stored in association with the first thumbnail image 411. Further, the image corresponding to the first thumbnail image 411 may be an image including the first subject A, or an image stored in response to a touch applied to the guide image 321 corresponding to the first subject A.

When the image 320 is stored, the controller 180 can display an eighth thumbnail image 418 corresponding to the stored image 320 on the display unit 151. When a touch is applied to the eighth thumbnail image 418, the controller 180 can display the image 320 corresponding to the eighth thumbnail image 418 on the display unit 151. The stored image 320 may correspond to an image which is captured by focusing on the first subject A.

When a touch is applied to a guide image, the controller 180 can capture an image by focusing the camera 121 on the touch-applied area and store the captured image by being associated with prestored other images based on a subject corresponding to the guide image. In accordance with this embodiment, the user can store a plurality of images each with a desired subject in focus to be discriminative from other images.

However, even if the guide image is not displayed, when a touch is applied to a discriminative person included in the captured image, the controller 180 can control the captured image in substantially the same control manner as using the guide image. That is, images may be stored in an associating manner, in response to touches applied to substantially the same object.

Figure 4B:
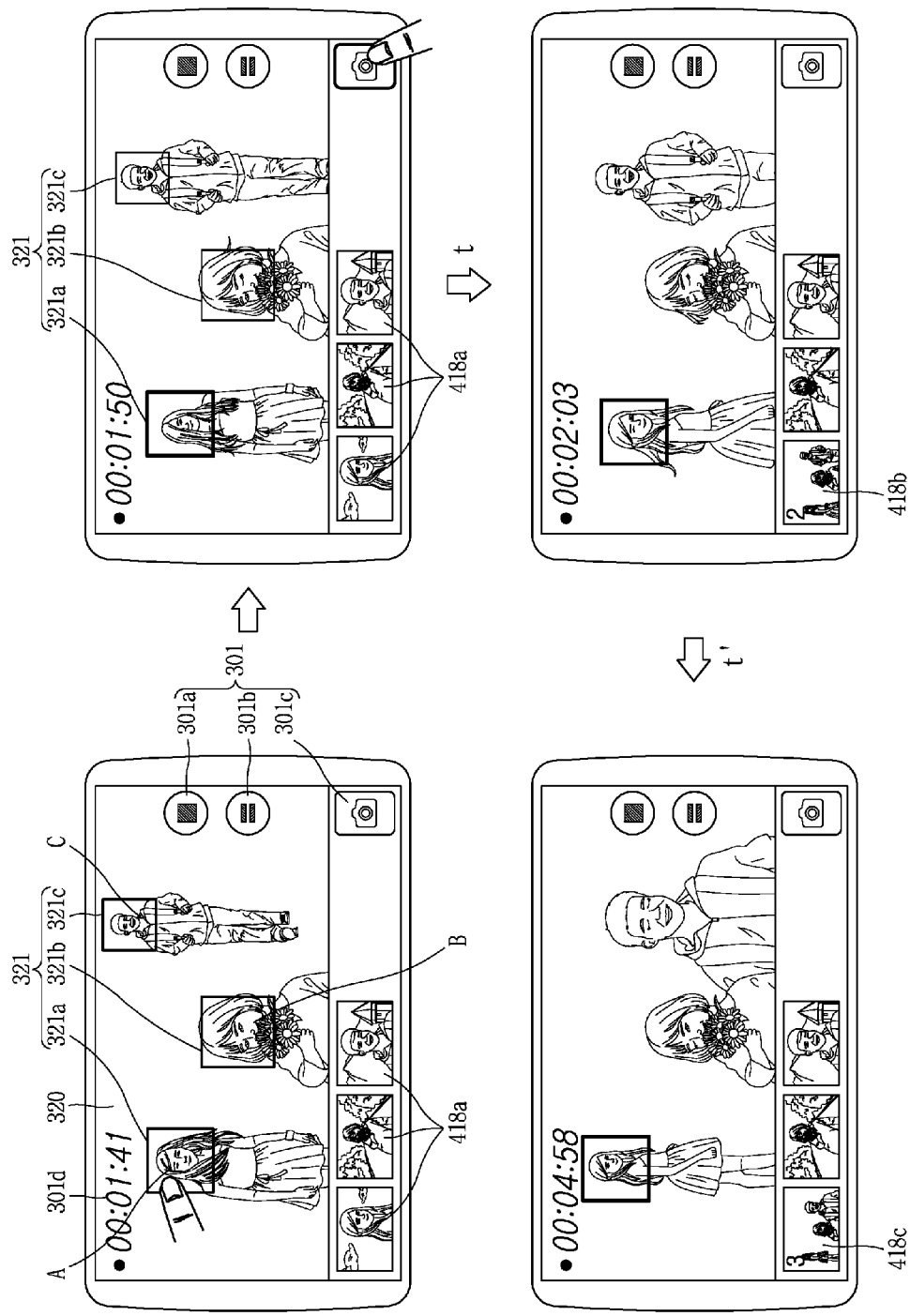

Referring to FIG. 4B, the display unit 151 can output the guide image 321 including first to third guide images 321a, 321b and 321c corresponding to the first to third subjects A, B and C, respectively. The display unit 151 can output an image 320 detected by the camera, and first thumbnail images 418a corresponding to prestored images.

When a touch is applied to the third icon 301c after a touch is applied to the first guide image 321a, the controller 180 can store images displayed on the display unit 151 at preset time intervals in the memory 170, by being associated with a subject corresponding to the first guide image 321a. When a touch is applied to the first guide image 321a, the first guide image 321a can be transformed to indicate that the first subject A corresponding to the first guide image 321a has been selected. Here, a touch for selecting a guide image can be distinguished from another touch applied to the guide image for storing an image. For example, the touch input applied for selecting the guide image in this embodiment may correspond to a long touch input.

In addition, when one thumbnail image is generated in response to a touch applied to the first guide image 321a, the controller 180 can group the image displayed on the display unit 151 at the touch-applied time point into the same category as the image of the thumbnail image for storage. The controller 180 can also store the image into the same category as the prestored images, by employing substantially the same control method of applying a touch to the first guide image 321a at the preset time interval "t." An additional third thumbnail image 418c can also be formed on the second thumbnail image 418b.

In more detail, the controller 180 can deselect a selected guide image, in response to a touch applied to the selected guide image. When the guide image is deselected, images are not stored at a specific time interval. In addition, images stored at the specific time interval in the selected state of the first guide image 321a can be captured when the camera is focused on the first subject A corresponding to the first guide image 321a.

In more detail, the controller 180 can select a plurality of guide images, and group and store images, in which subjects corresponding to different guide images are in focus, into different categories at specific time intervals. Also, the controller 180 can not store the image when the subject is not sensed by the camera. In addition, the controller 180 can store the image again at the specific time interval when the subject is sensed again by the camera 121. Further, the controller 180 can automatically terminate the function of storing images when the subject selected by the camera disappears. Thus, in accordance with this embodiment, the user can capture images including a desired subject at a specific time interval.

Referring to FIG. 4C, the display unit 151 can display the guide images 321a, 321b and 321c on the first to third subjects A, B and C, respectively, while the camera 121 is activated. In addition, the display unit 151 can display an image 320 obtained by the camera 121, and a thumbnail image 418a of a captured image in response to a touch input. The controller 180 can also store the image and additionally display a thumbnail image corresponding to the stored image on the display unit 151, in response to a touch applied to the third icon 301c.

Further, the controller 180 can transform a shape of the third icon 301c, in response to a specific touch input applied to the third icon 301c. When a touch is applied to the first guide image 321a after the third icon 301c is transformed, the controller 180 can store an image obtained by the camera 121 at the touch-applied time point by being associated with the image with a prestored specific image. In addition, the image may be captured when the touch-applied area is in focus.

The controller 180 can also display a second thumbnail image 418b on the display unit 151 corresponding to the stored image. In addition, when a touch is applied to the third icon 301c in the transformed state of the third icon 301c, the controller 180 can store an image output on the display unit 151 at the touch-applied time point.

Also, the image may be stored in association with another image related to a subject included in the image. For example, when the thumbnail images correspond to the first to third subjects A, B and C, respectively, the subject-related images can be stored by being associated with the images corresponding to the respective thumbnail images. Further, in a non-transformed state of the third icon 301c, when a touch is applied to the guide image, a focus can be changed while the video capturing is performed.

Accordingly, a third thumbnail image 418c of an image stored in response to a touch applied to the third icon 301c can be displayed on the display unit 151. In more detail, each of a plurality of images captured in response to the touches can be captured and stored with different areas in focus.

Further, when a specific touch input (e.g., a long touch input) is applied to the third icon 301c, the controller 180 can restore the shape of the third icon 301c, and store an image output on the display unit 151 along with images related to the touch-applied subject by applying a touch to the guide image, or store the same image by grouping into different categories. In accordance with this embodiment, the user can store an image by applying a touch to one area including a desired person, and store the image in different categories in an associating manner.

Figure 4D:
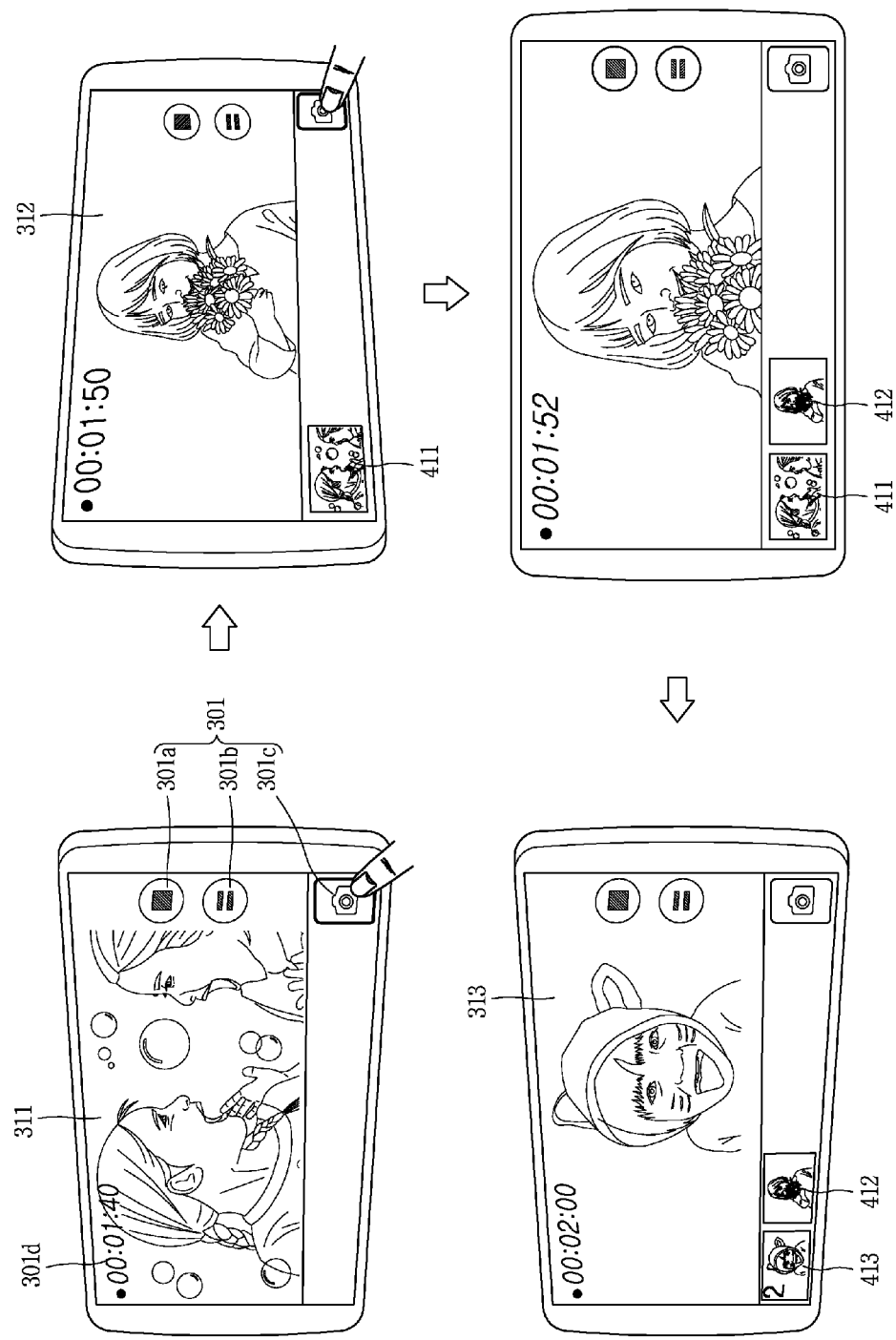

Next, FIG. 4D is a conceptual view illustrating a control method of storing an image based on a motion (movement) of a terminal main body. The mobile terminal according to this embodiment includes a sensing unit to sense a motion of the terminal main body. For example, the sensing unit may be implemented as at least one of an acceleration sensor, a magnetic sensor, a gravity sensor (G-sensor) and a gyroscope sensor.

The controller 180 can store a first image 311 displayed on the display unit 151 at a touch-applied time point when the touch is applied to the third icon 301c at a first posture. The display unit 151 can display a thumbnail image 411 corresponding to the stored first image 311. When a touch is applied to the third icon 301c at a second posture different from the first posture, the controller 180 can store a second image 312 displayed on the display unit 151 at the touch-applied time point in the memory 170, and display a second thumbnail image 412 corresponding to the second image 312.

When a touch is applied to the third icon 301c after sensing that the terminal body is maintained at the first posture again, the controller 180 can store a third image 313 displayed on the display unit 151 at the touch-applied time point by being associated with the first image 311. Also, the controller 180 can display a thumbnail image 413 corresponding to the third image 313, instead of the first thumbnail image 411.

When the first posture of the terminal body is maintained for a preset time, the controller 180 can store the third image 313 in the memory 170 even if a touch is not applied to the third icon 301c. In accordance with this embodiment, images stored at a specific posture can be classified into the same category, which allows the user to categorize and store images captured based on a position where the terminal captures a subject and a motion of the terminal.

Figure 5A:
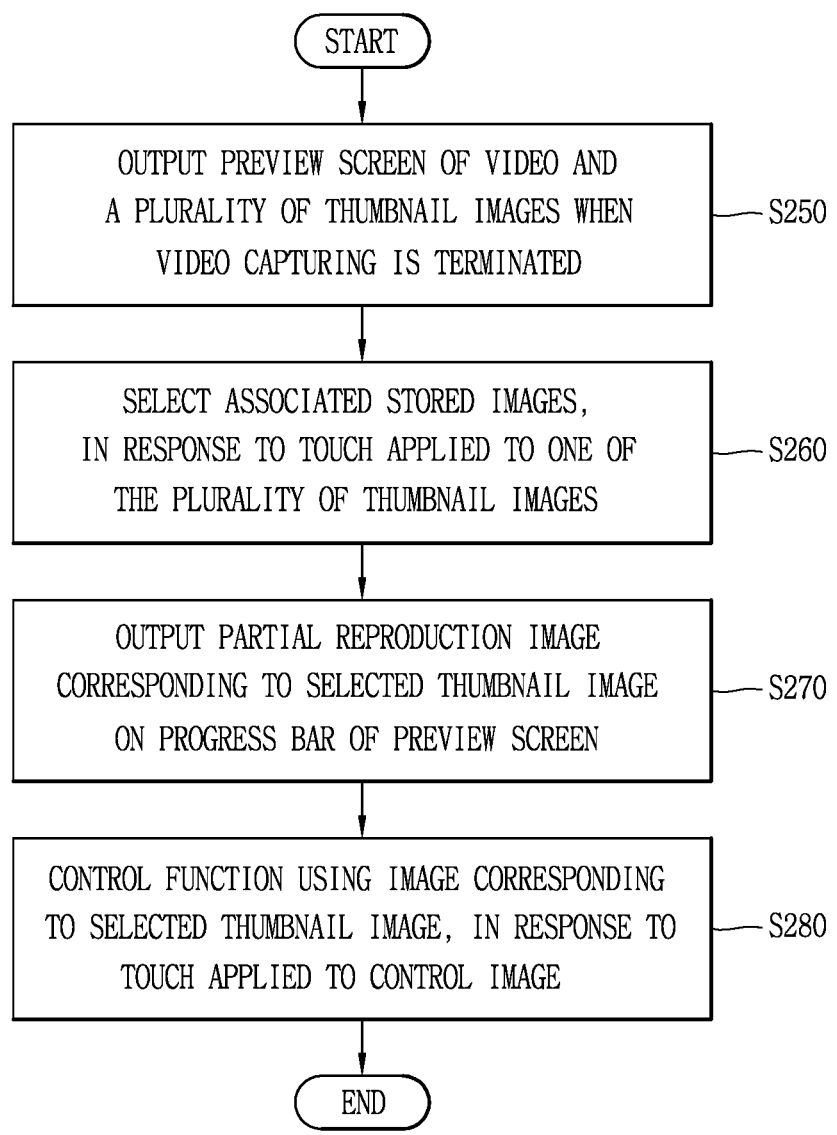
FIG. 5A is a flowchart illustrating a control method of controlling a function associated with a stored image.

Next, FIG. 5A is a flowchart illustrating a control method of controlling a function associated with an associated stored image, and FIGS. 5B to 5E are conceptual views illustrating a control method of editing a stored video file and images in accordance with different embodiments disclosed herein.

As illustrated in FIG. 5A, when a video capturing is terminated, the display unit 151 can display a preview screen of the video and a plurality of thumbnail images (250). Here, the plurality of thumbnail images correspond to a plurality of images stored, respectively, and are arranged in the order of being stored according to a lapse of time for which the video has been captured. In particular, one thumbnail image can correspond to one stored image, and the display unit 151 does not display visual information related to associated images.

In addition, the preview screen corresponds to one image included in the video file, and may include a progress bar indicating a reproduction duration of the video file, reproduction information regarding the video file and the like. Further, the plurality of thumbnail images can be displayed adjacent to one area of the progress bar corresponding to stored time points thereof, but the present invention is not limited to this.

Associated stored images can then be selected in response to a touch applied to one of the plurality of thumbnail images (S260). When the associated stored images are selected, the thumbnail image corresponding to the selected images can be displayed on the display unit 151 in a highlighting manner.

Further, the controller 180 can display partial reproduction images corresponding to the selected images on the progress bar (S270). In one example, a partial reproduction image corresponds to a video frame which includes a selected image and is displayed for a preset period of time. Thus, the user can select a part of the video file, which includes stored images and is reproduced for a specific period of time, and control the selected part of the video file.

In addition, the controller 180 can control a function using an image corresponding to a selected thumbnail image, in response to a touch applied to a control image included in the preview screen. In particular, the function may correspond to a function which uses at least one of a selected image, a partial video including the selected image, and a full video, which will be described in detail hereinafter with reference to the accompanying drawings.

Figure 5B:
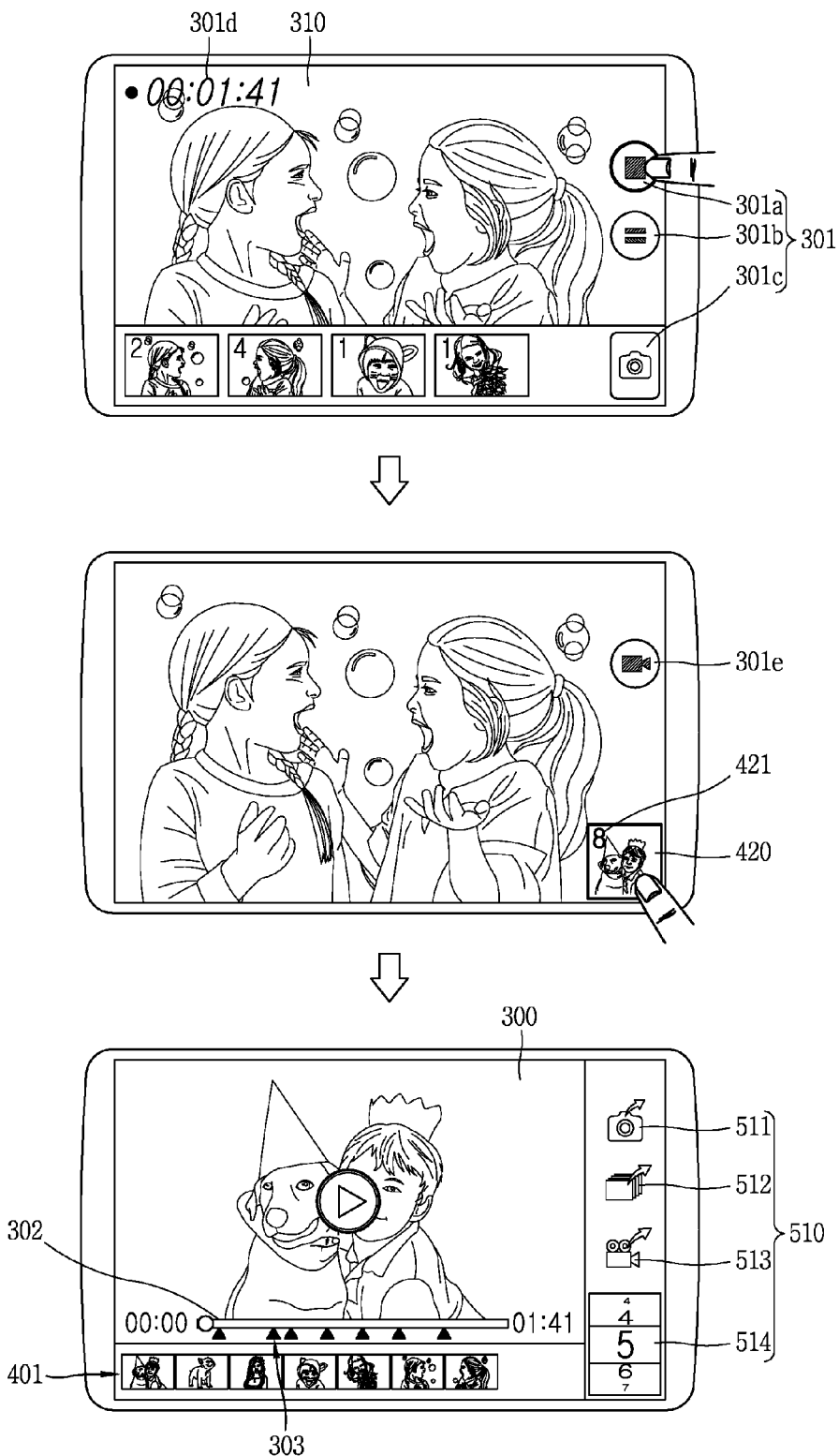
FIGS. 5B to 5E are conceptual views each illustrating a control method of editing a stored video file and images in accordance with different embodiments disclosed herein.

As illustrated in FIG. 5B, the controller 180 can generate a video file using the captured images, in response to a touch applied to the first icon 301a. While a preview image obtained by an activated camera is displayed, the first icon 301a can be changed into a fifth icon 301e. When a touch is applied to the fifth icon 301e, images captured by the camera 121 are stored and thus a video capturing function can be executed.

Further, a graphic image 420 indicating the stored video file and images can be output on the preview image. In particular, the graphic image 420 may include a thumbnail image corresponding to one image of the video file, and a number 421 of stored images during execution of the video capturing function.

The controller 180 can also display screen information on the display unit 151 for checking the video file and the stored images, in response to a touch applied to the graphic image 420. In more detail, the screen information may include a preview screen 300, a progress bar 302 indicating a reproduction duration of the video file, a storage point 303 indicating a stored time point of at least one image, and thumbnail images 401 corresponding to the plurality of images stored.

In addition, when the video file is generated, the display unit 151 can display a control image 510 for controlling the video file. As shown, the control image 510 may include a first control icon 511 for sharing a stored image, a second control icon 512 for sharing information regarding a selected frame of the video, and a third control icon 513 for sharing a video of a selected frame. Thus, the user can selectively share at least part of the stored video file and images. Here, the sharing may be performed by transmitting information to a specific server or a specific external device using the wireless communication unit 110. The control image 510 can also include a fourth control icon 514 for adjusting an output duration (seconds) of the selected frame.

Figure 5C:
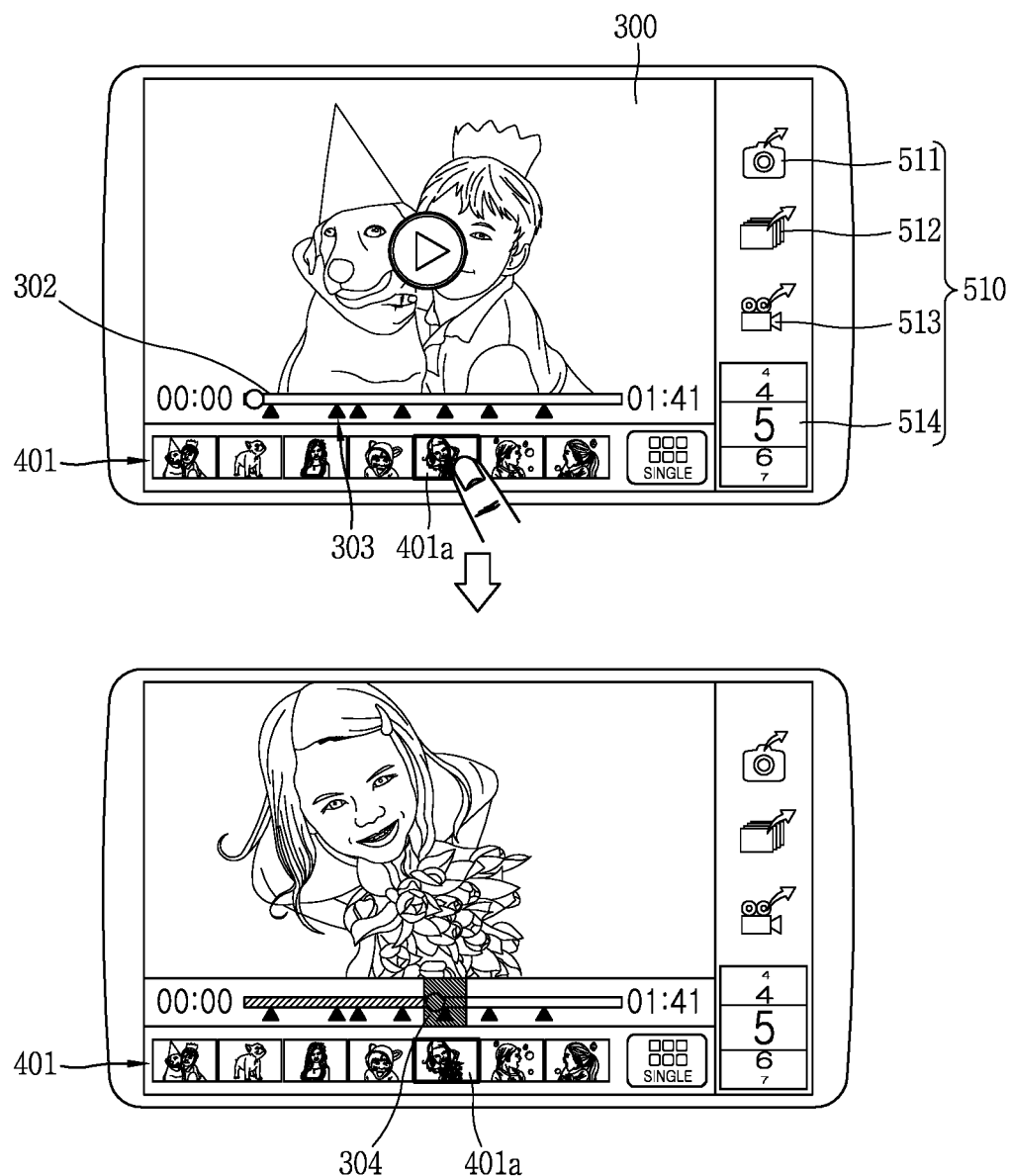

Referring to FIG. 5C, when a touch is applied to a first thumbnail image 401a of the plurality of thumbnail images 401, the controller 180 can set a reproduction duration, based on a storage point 303 and a preset output duration of the first thumbnail image 401a. The reproduction duration may include time points that the images corresponding to the thumbnail images 401 are displayed. For example, the reproduction duration can be set to a duration from a specific time before the image-output time point to a specific time after the image-output time point.

In more detail, when the output duration is set to 5 seconds, the reproduction duration can be set to a duration from 2 seconds before the image is output to 3 seconds after the image is output. Further, the display unit 151 can display a partial reproduction image 304 indicating the reproduction duration on the progress bar 302. The controller 180 can also move an indicator, which indicates a reproduction time point on the progress bar 302, to an initial area of the partial reproduction image 304, and display an image on the display unit 151 corresponding to a reproduction area where the indicator is located on the progress bar 302.

However, the reference of setting the reproduction duration is not limited to this. For example, the reproduction duration can be set to 5 seconds after the stored image is displayed, or 5 seconds before the stored image is displayed. The user can also set a reproduction duration based on a stored image, so as to partially display a video file or share one frame of the video file corresponding to the set reproduction duration.

Figure 5D:
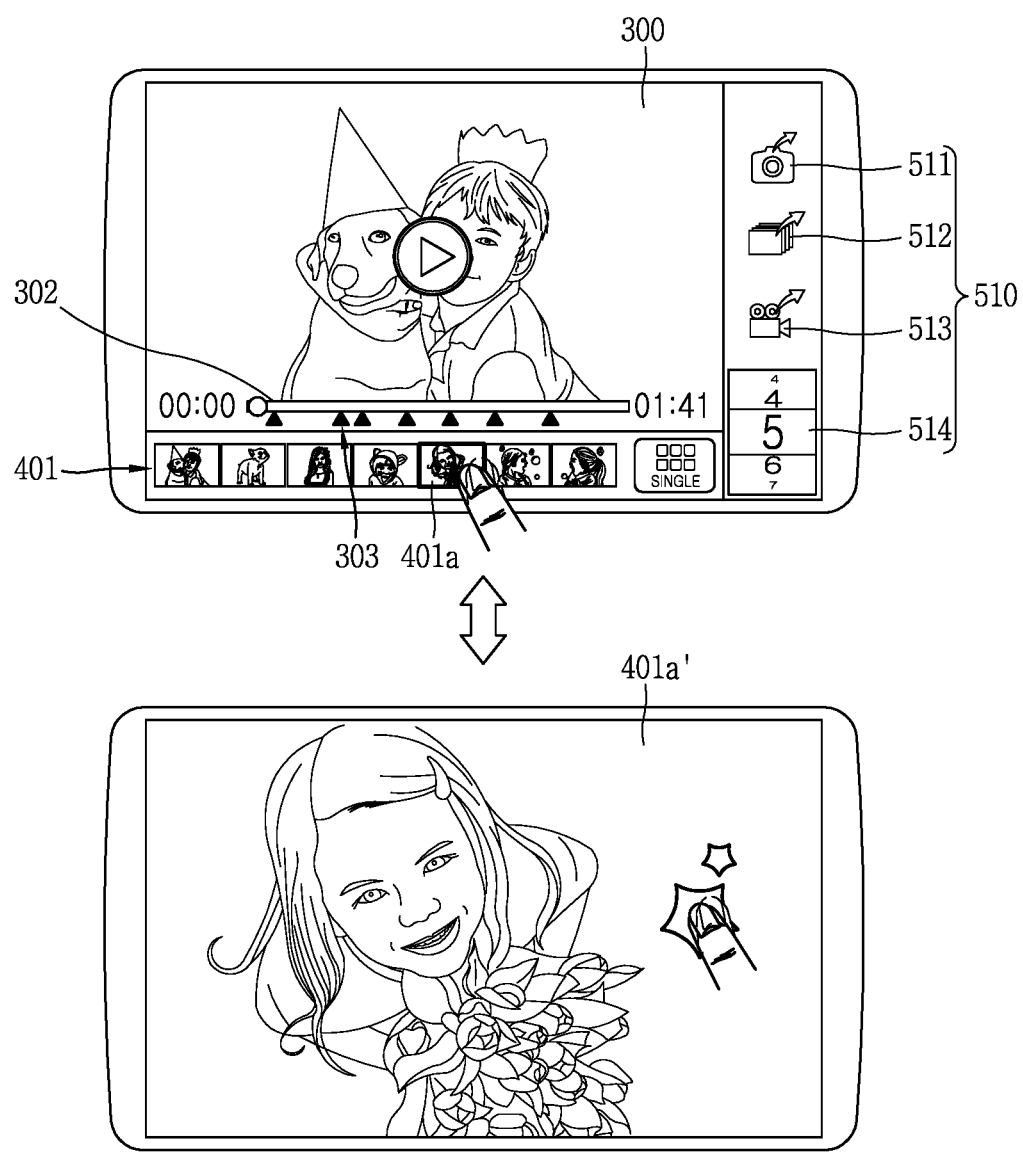

Referring to FIGS. 5C and 5D, when a first touch is applied to the thumbnail image 401a, the controller 180 can display a partial reproduction image corresponding to the thumbnail image 401a on the display unit 151. Further, when a second touch is applied to the thumbnail image 401a, the controller 180 can fully display an image 401a' on the display unit 151, and which corresponds to the thumbnail image 401a and is stored in the memory 170.

For example, the second touch may correspond to a long touch input or a double touch input applied to the thumbnail image 401a for a specific period of time. The controller 180 can then display screen information including the preview screen 300 and the control image 510 on the display unit 151 when a touch is applied to the stored image 401a'. In accordance with this embodiment, the user can check a reproduction duration corresponding to a stored image or fast check the stored image, by applying a different type of touch to a thumbnail image.

Figure 5E:
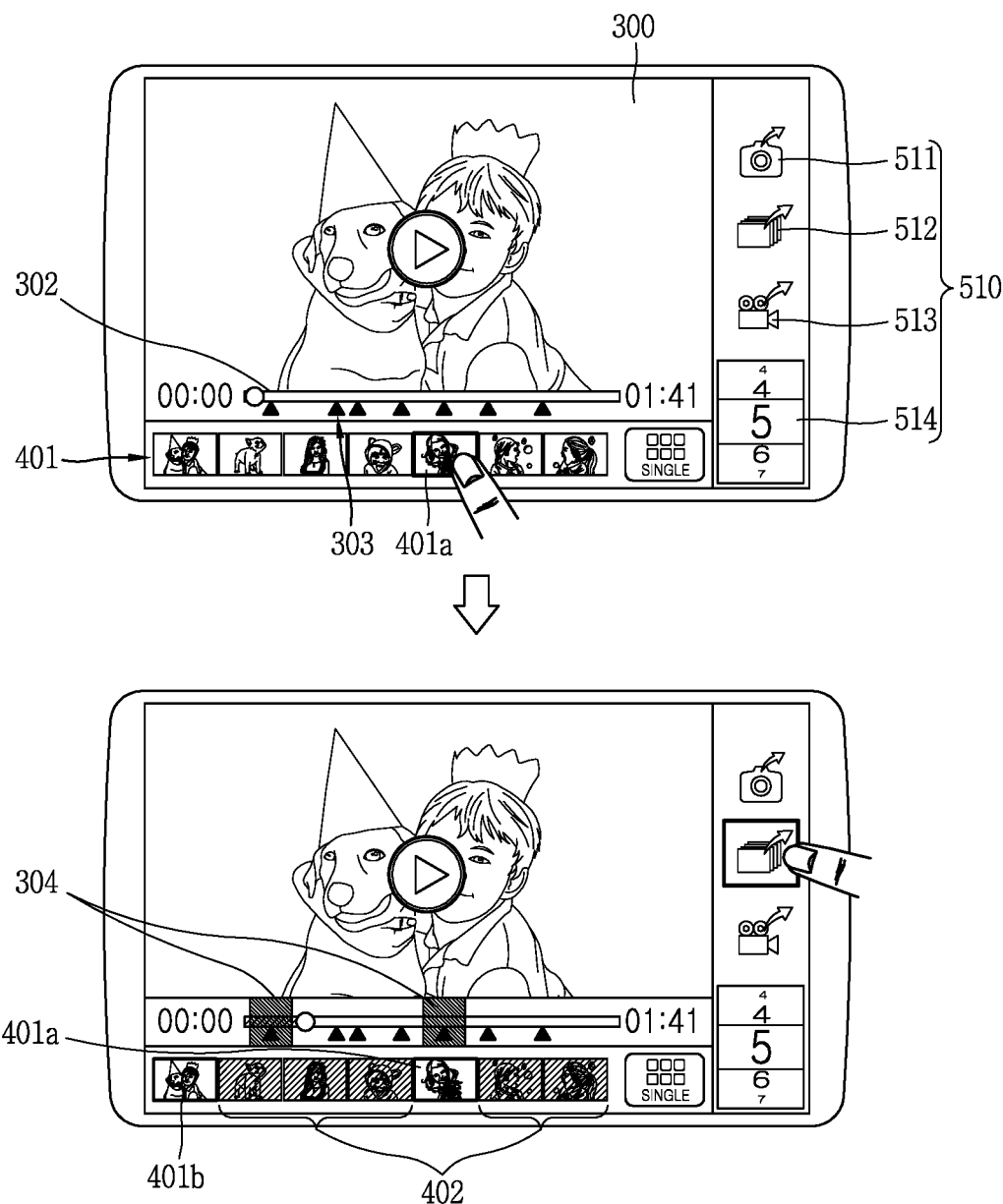

Referring to FIG. 5E, when the user selects the first thumbnail image 401a from the plurality of thumbnail images 401, the controller 180 can transform the selected first thumbnail image 401a, and also transform a second thumbnail image 401b of a stored image in association with the image of the first thumbnail image 401a. For example, when images corresponding to the first and second thumbnail images 401a and 401b are stored in an associating manner, the controller 180 can transform thumbnail images 401a and 401b in response to a touch applied to the first thumbnail image 401a. That is, images stored in the same category can be selected.

In addition, the other thumbnail images 402 which are stored in different categories from the image of the first thumbnail image 401a can be transformed. For example, the controller 180 can highlight the first and second thumbnail images 401a and 401b or display in an inactivate state other thumbnail images except for the first and second thumbnail images 401a and 401b.

Further, the controller 180 can display the partial reproduction images 304 corresponding to the first and second thumbnail images 401a and 401b on the progress bar 302, in response to a touch applied to the first thumbnail image 401a. When a touch is applied to the control image 510 after a part of the thumbnail images is selected, a stored image and information regarding a selected frame of a video or a video of a selected frame may be shared.

Figure 6A:
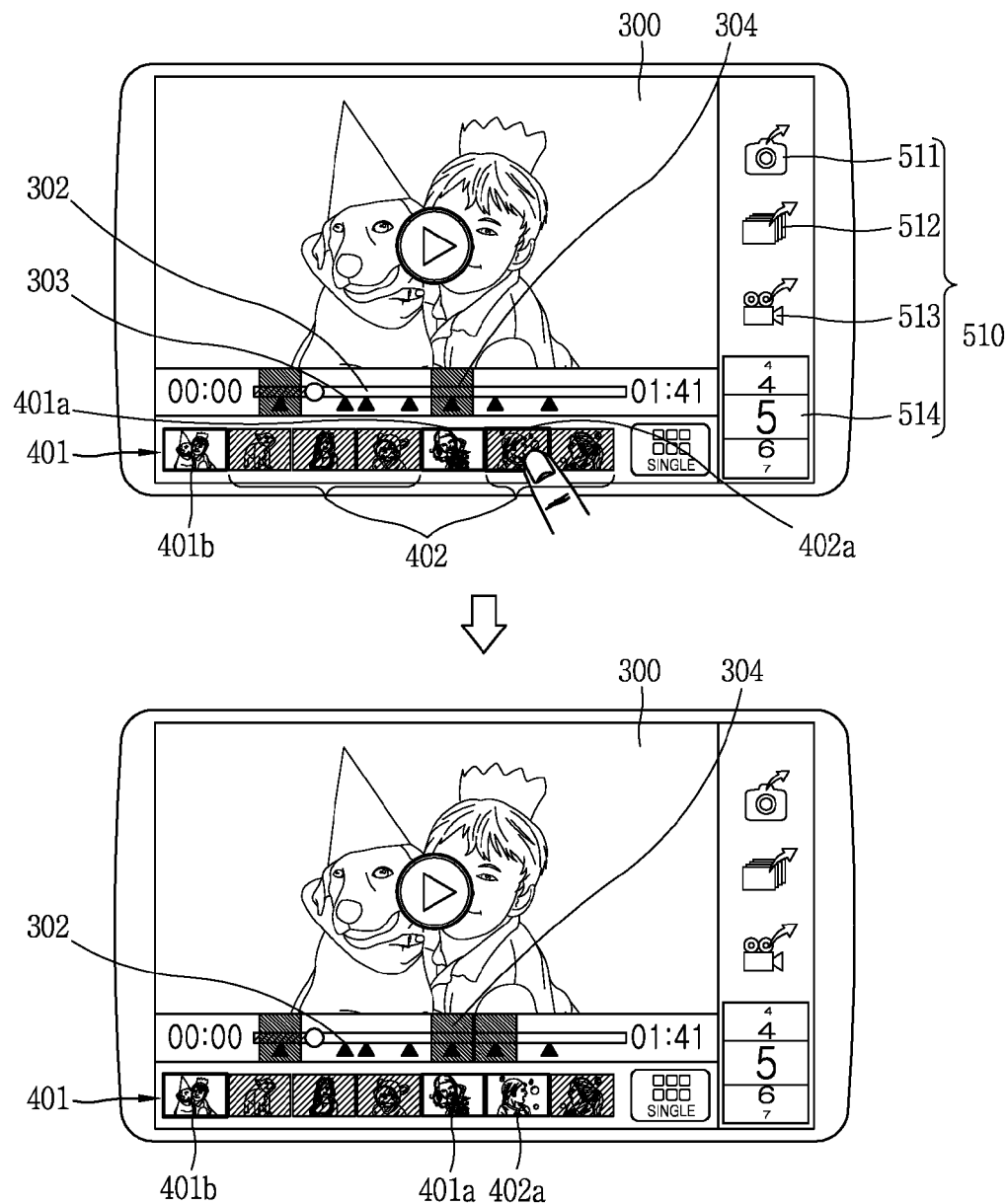
FIGS. 6A and 6B are conceptual views illustrating a control method of individually selecting discriminatively-stored images.
Figure 6B:
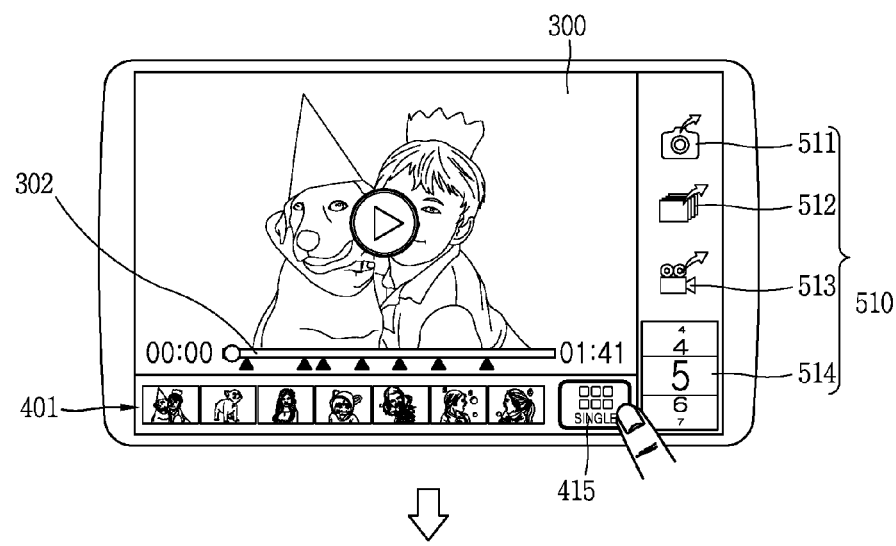
Figure 6B:
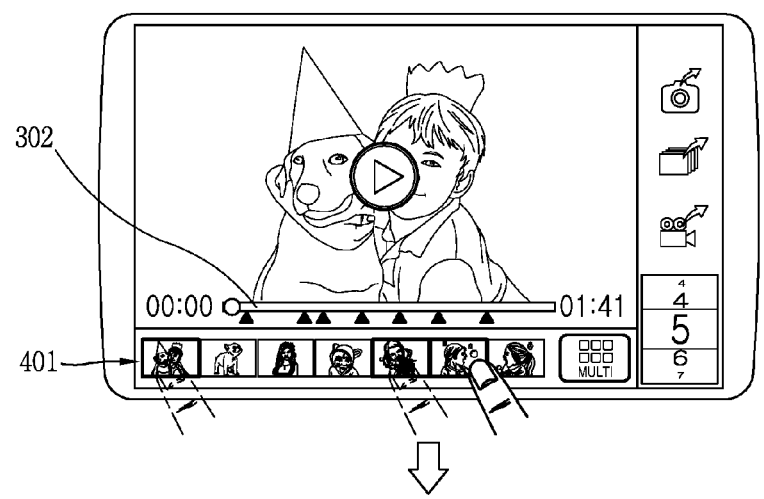
Figure 6B:
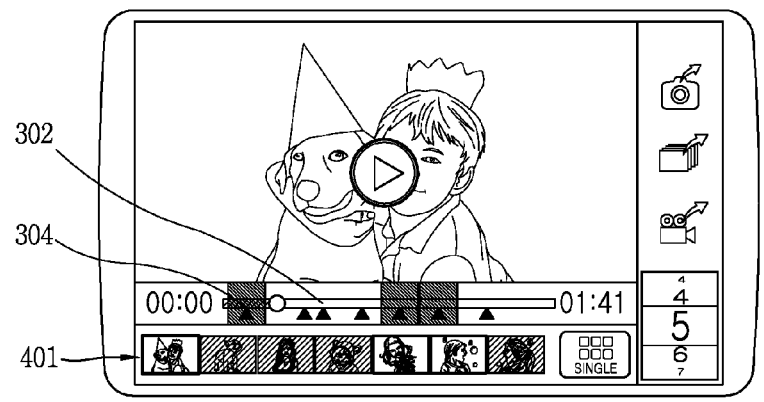

Next, FIGS. 6A and 6B are conceptual views illustrating a control method of individually selecting discriminatively-stored images. As illustrated in FIG. 6A, the controller 180 can select the first and second thumbnail images 401a and 401b, in response to a touch applied to the first thumbnail image 401a of the plurality of thumbnail images 401. The controller 180 can then display the partial reproduction images 304 corresponding to the first and second thumbnail images 401a and 401b on the progress bar 302. The display unit 151 can also display the first and second thumbnail images 401a and 401b and the other thumbnail images 402 in different manners.

In addition, the controller 180 can select a third thumbnail image 402a, in response to a touch applied to the third thumbnail image 402a of the other thumbnail images 402. Also, the controller 180 can transform the third thumbnail image 402a, and additionally display a partial reproduction image 304 of an image corresponding to the third thumbnail image 402a.

Further, the controller 180 can select another thumbnail image, which belongs to the same category as the first thumbnail image 401a, in response to a touch applied to the first thumbnail image 401a, and additionally select a third thumbnail image 401c which belongs to a different category. In this instance, images which are grouped into different categories, frame information and video frame can be shared.

Referring to FIG. 6B, the controller 180 can display a fifth control icon 415 for individually selecting thumbnail images on the display unit 151. The controller 180 can then select some of the plurality of thumbnail images 401 when a touch is applied to the fifth control icon 415. The fifth control icon 415 can also be transformed in response to a touch applied thereto.

When another touch is applied to some of the plurality of thumbnail images after the touch is applied to the fifth control icon 415, some of the plurality of thumbnail images may be selected. In this instance, even though one thumbnail image is selected, another thumbnail image belonging to the same category may not be selected. That is, after the touch is applied to the fifth control icon 415, each thumbnail image can be individually selected by applying a touch thereto. Further, the controller 180 can display the partial reproduction image 304 corresponding to the selected thumbnail image. In more detail, when a touch is applied again to the fifth control icon 415, the controller 180 can display thumbnail images stored in the same category to be selected at once.

Figure 7A:
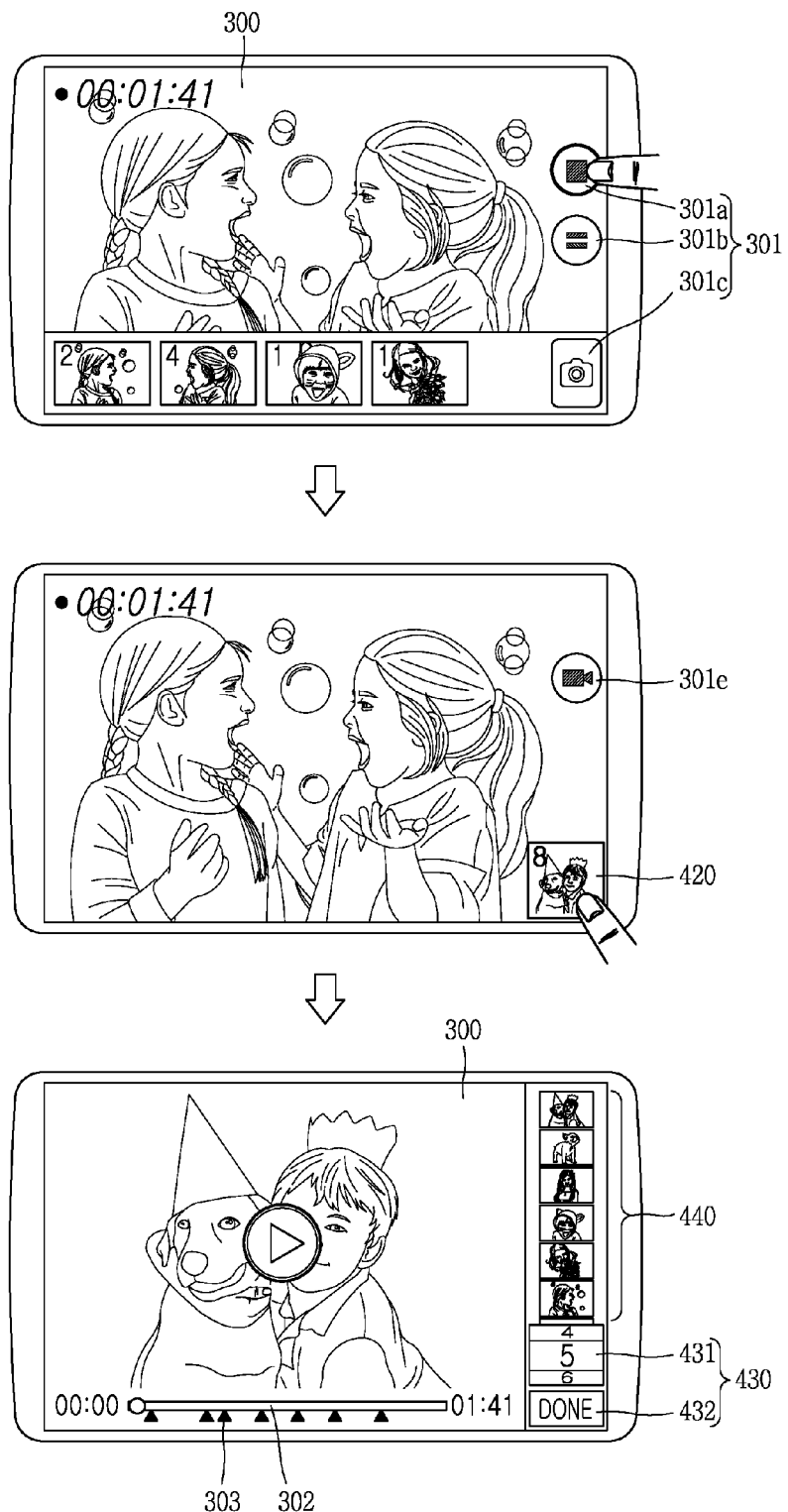
FIGS. 7A to 7C are conceptual views illustrating a control method of editing a classification of images in accordance with different embodiments.
Figure 7B:
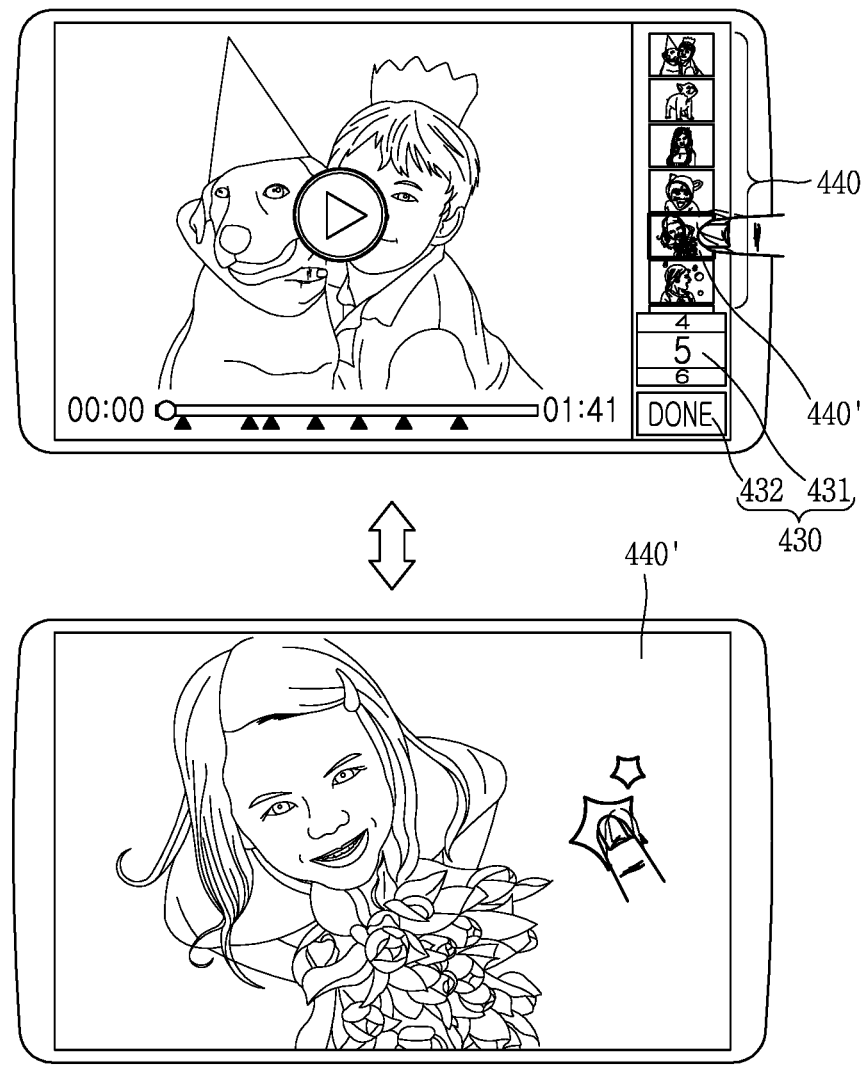
Figure 7C:
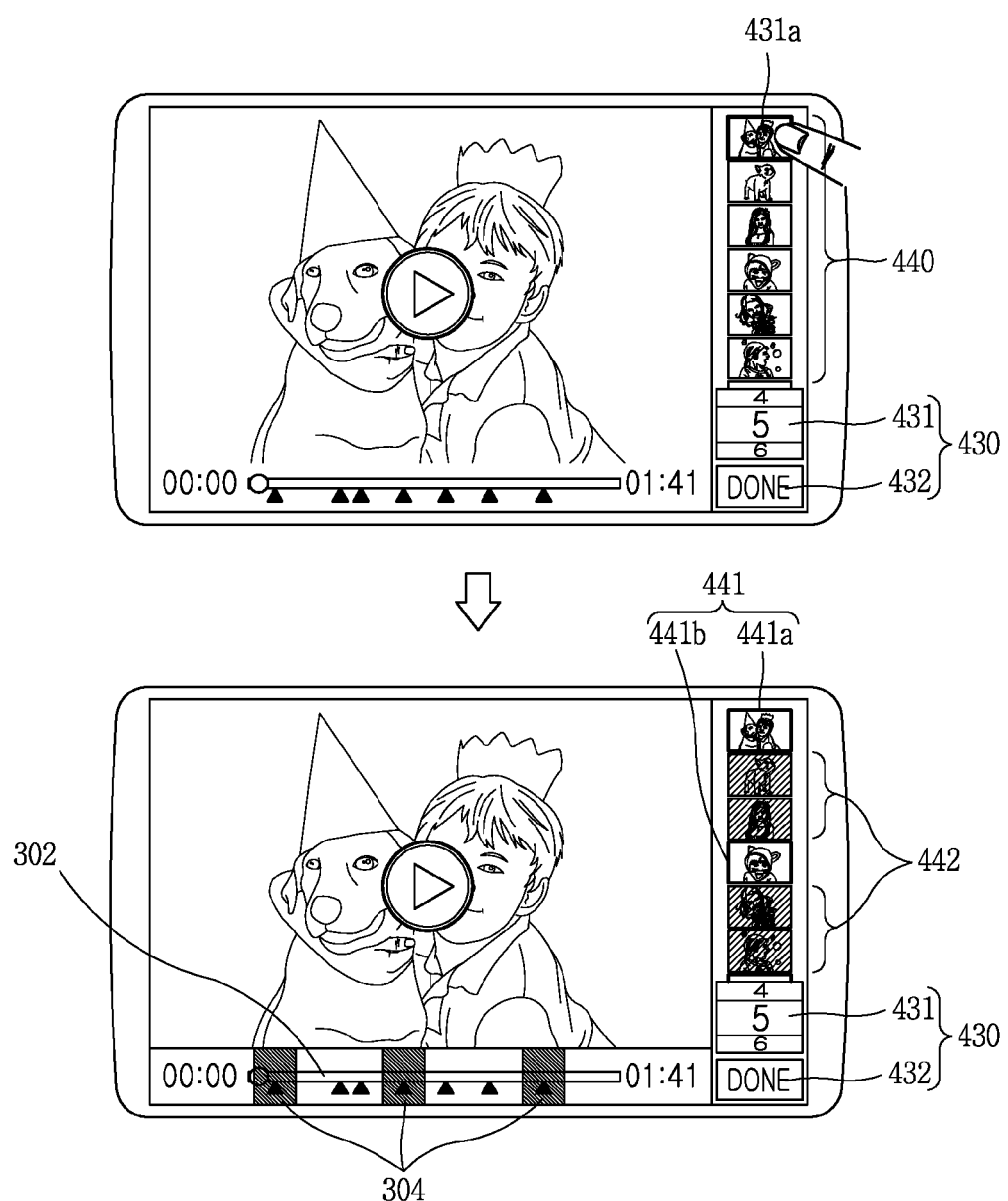

Next, FIGS. 7A to 7C are conceptual views illustrating a control method of editing a classification (categorization) of images in accordance with different embodiments. As illustrated in FIGS. 5A and 7A to 7C, positions of thumbnail images and a control image may differ according to a plurality of images stored. However, the thumbnail images and the control image displayed on the display unit may have substantially the same function. Further, the control method illustrated in FIGS. 7A to 7C can also be applied substantially the same to the screen information including the thumbnail images and the control image illustrated in FIG. 5A.

Referring to FIG. 7A, the controller 180 can terminate the video capturing function when a touch is applied to the first icon 301a, and the first icon 301a can be converted into the fifth icon 301e. Further, the graphic image indicating the stored video file and images can be displayed on a preview image obtained by the camera. The graphic image may include a thumbnail image corresponding to one image of the video file, and a number 421 of stored images during execution of the video capturing function.

In addition, the controller 180 can display screen information on the display unit for checking the video file and the stored images, in response to a touch applied to the graphic image 420. As discussed previously, the screen information may include a progress bar 302 indicating a reproduction duration of the video file, a storage point 303 indicating a stored time point of at least one image, and thumbnail images 401 corresponding to the plurality of images stored.

Further, the controller 180 can display, on one area of the display unit 151, a control region 430 which includes a plurality of thumbnail images 401, and first and second control icons 431 and 432. The plurality of thumbnail images 440 can be arranged in an intersecting direction with the progress bar 302. However, the plurality of thumbnail images 440 are preferably arranged in the order of stored time points while the video capturing function is executed.

In addition, an output duration (seconds) of a selected frame can be adjusted in response to a touch applied to the first control icon 431. For example, the first control icon 431 can include a number for receiving a drag touch input and indicates a changed output duration. The second control icon 432 can also receive a touch for storing edited images when the plurality of thumbnail images are edited. A control method of editing a categorization of the plurality of thumbnail images will be described in detail later with reference to FIGS. 8A to 8D.

As illustrated in FIGS. 7B and 7C, the controller 180 can fully display an image corresponding to one thumbnail image 440' of the plurality of thumbnail images 440, in response to a first touch applied to the one thumbnail image 440'. For example, the first touch may be a long touch input. Also, when the first touch is applied again while the image is displayed on the display unit 151, screen information including the preview screen and the first and second control icons may be displayed.

In addition, when a second touch is applied to a first thumbnail image 441a of the plurality of thumbnail images 440, the controller 180 can select the first thumbnail image 441a. When the first thumbnail image 441a is selected, a second thumbnail image 441b belonging to the same category as the first thumbnail image 441a can also be selected. The display unit 151 can then output the first and second thumbnail images 441a and 441b and the other thumbnail images 442 in different manners or shapes to be distinguishable from each other.

In addition, the controller 180 can display partial reproduction images 304 on the display unit 151 corresponding to the first and second thumbnail images 441a and 441b. In more detail, when a touch is applied to the second control icon 432 after at least one thumbnail image is selected, the controller 180 can display screen information on the display unit 151 for controlling sharing of the image and the like.

Next, FIGS. 8A to 8D are conceptual views illustrating a control method of modifying categories of prestored images. As illustrated in FIG. 5A and FIGS. 8A to 8D, positions of thumbnail images and a control image may differ according to a plurality of images stored. However, the thumbnail images and the control image output on the display unit 151 may have substantially the same function. The control method illustrated in FIGS. 7A to 7C can also be applied substantially the same to the screen information including the thumbnail images and the control images illustrated in FIG. 5A.

Figure 8A:
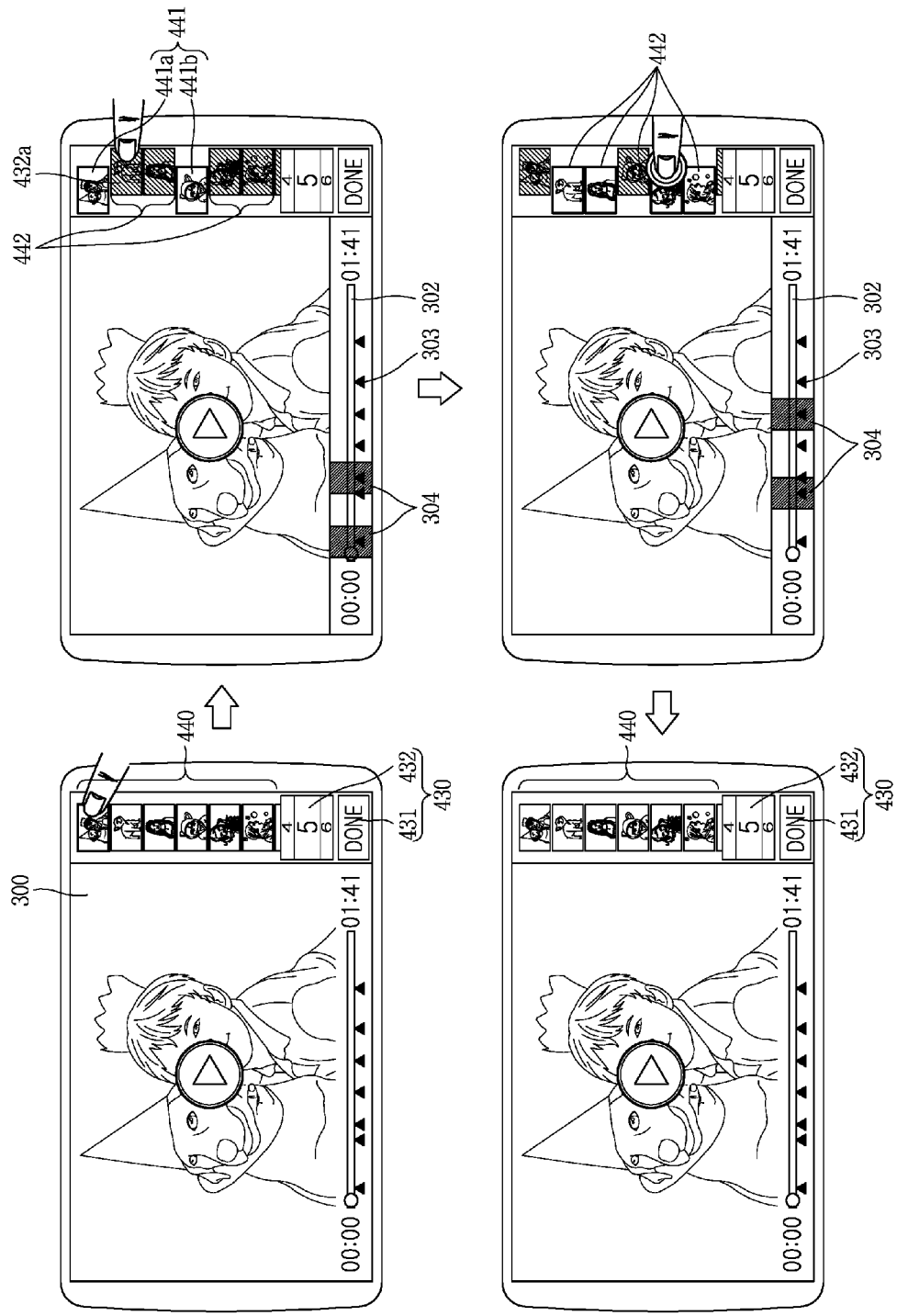
FIGS. 8A to 8D are conceptual views illustrating a control method of modifying categories of prestored images.

As illustrated in FIG. 8A, when a touch is applied to the first thumbnail image 441a of the plurality of thumbnail images, the controller 180 can select the second thumbnail image 441b classified into the same category as the first thumbnail image 441a. Images corresponding to the first and second thumbnail images 441a and 441b may belong to a first category 441.

When the plurality of thumbnail images 440 are arranged in a first direction, the first and second thumbnail images 441a and 441b selected in response to the touch can move in a second direction which intersects with the first direction. Also, the other thumbnail images can move in an opposite direction to the second direction. Accordingly, the user can easily distinguish the selected thumbnail images and non-selected thumbnail images from each other.

When a touch is applied to one of the other thumbnail images except for the first and second thumbnail images 441a and 441b, the first and second thumbnail images 441a and 441b can be deselected, and the other thumbnail images can be selected. Images corresponding to the other thumbnail images can also be grouped into the same category in an associating manner.

In addition, the controller 180 can display partial reproduction images corresponding to the selected thumbnail images on the display unit 151, in response to touches applied to the thumbnail images. The controller 180 can also deselect the selected thumbnail image when a specific touch input is applied to the selected thumbnail image. For example, the specific touch input may be a long touch input. When the selected thumbnail image is deselected, the controller 180 can stop displaying the partial reproduction image 304 and switch the second control icon 432 into an inactive state.

Figure 8B:
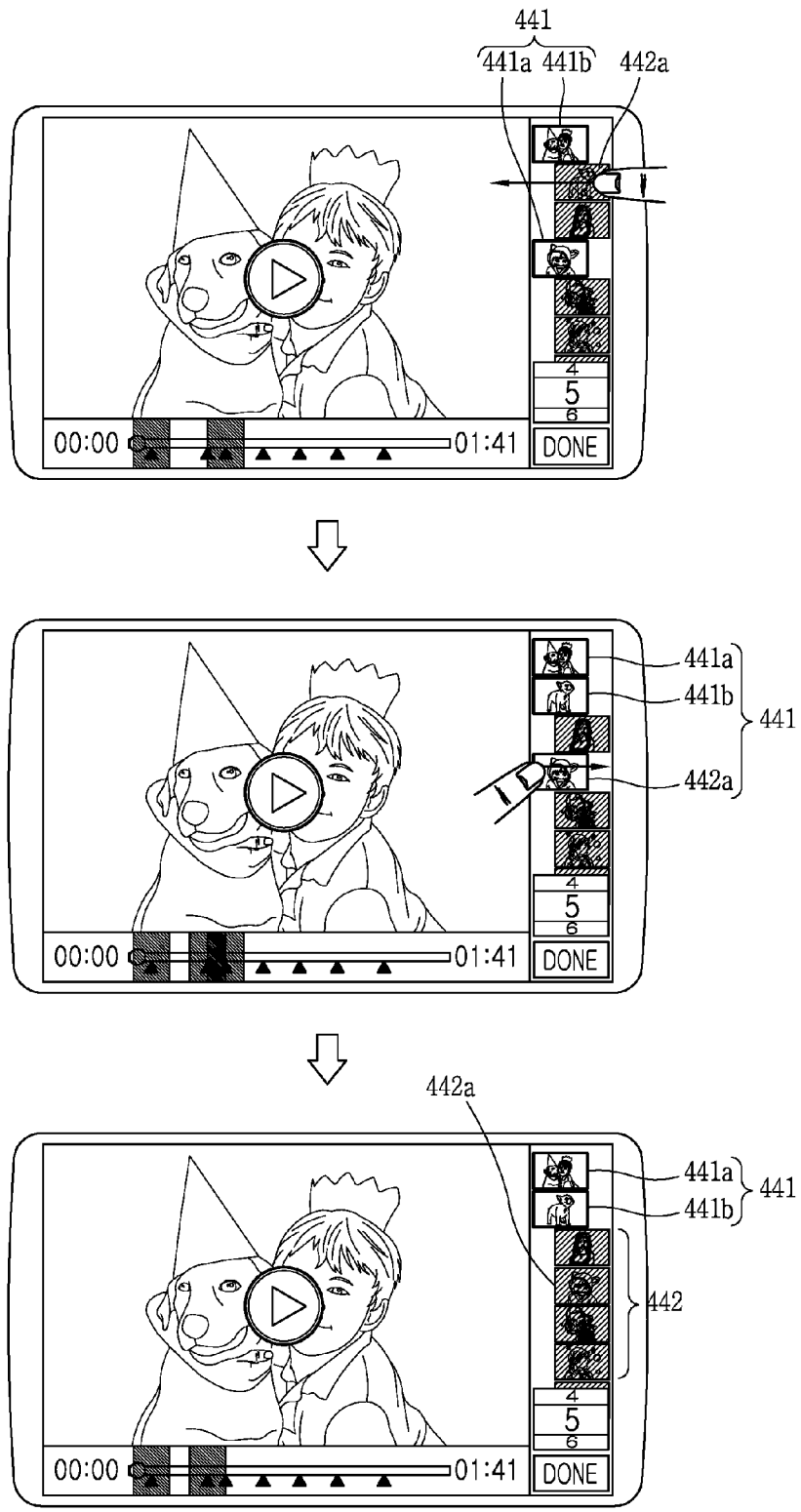

Referring to FIG. 8B, when the first and second thumbnail images 441a and 441b are selected, the controller 180 can display the selected first and second thumbnail images 441a and 441b in a moved state in the second direction. When a drag touch input is applied in the second direction to a third thumbnail image 442a corresponding to an image stored in a different category from the category of the first and second thumbnail images 441a and 441b, the image corresponding to the third thumbnail image 442a can be stored by being associated with the first and second thumbnail images 441a and 441b.

In this instance, the associated state of the third thumbnail image 442a with other images may be released. That is, the category in which the image corresponding to the third thumbnail image 442a is stored can be changed. Accordingly, the third thumbnail image 442a can move in the first direction to be displayed in parallel to the first thumbnail image 441a. Also, a partial reproduction image corresponding to the third thumbnail image 442a may be displayed.

In addition, when a touch is applied to the second thumbnail image 441b in an opposite direction to the second direction, the associated state between the image corresponding to the second thumbnail image 441b and the image corresponding to the first thumbnail image 441a can be released. That is, the category in which the image of the second thumbnail image 441a is stored can be changed. The image of the second thumbnail image 441b can also be stored in association with the other thumbnail images 442, but the present invention is not limited to this.

That is, the controller 180 can change a category for storing an image, in response to a touch applied to the thumbnail image in the second direction or the opposite direction to the second direction, and change the output position and shape of the thumbnail image on the display unit 151 for notifying the category change. In accordance with this embodiment, the user can recognize the associated state among the plurality of images stored, and more easily change the stored associated state (category).

Figure 8C:
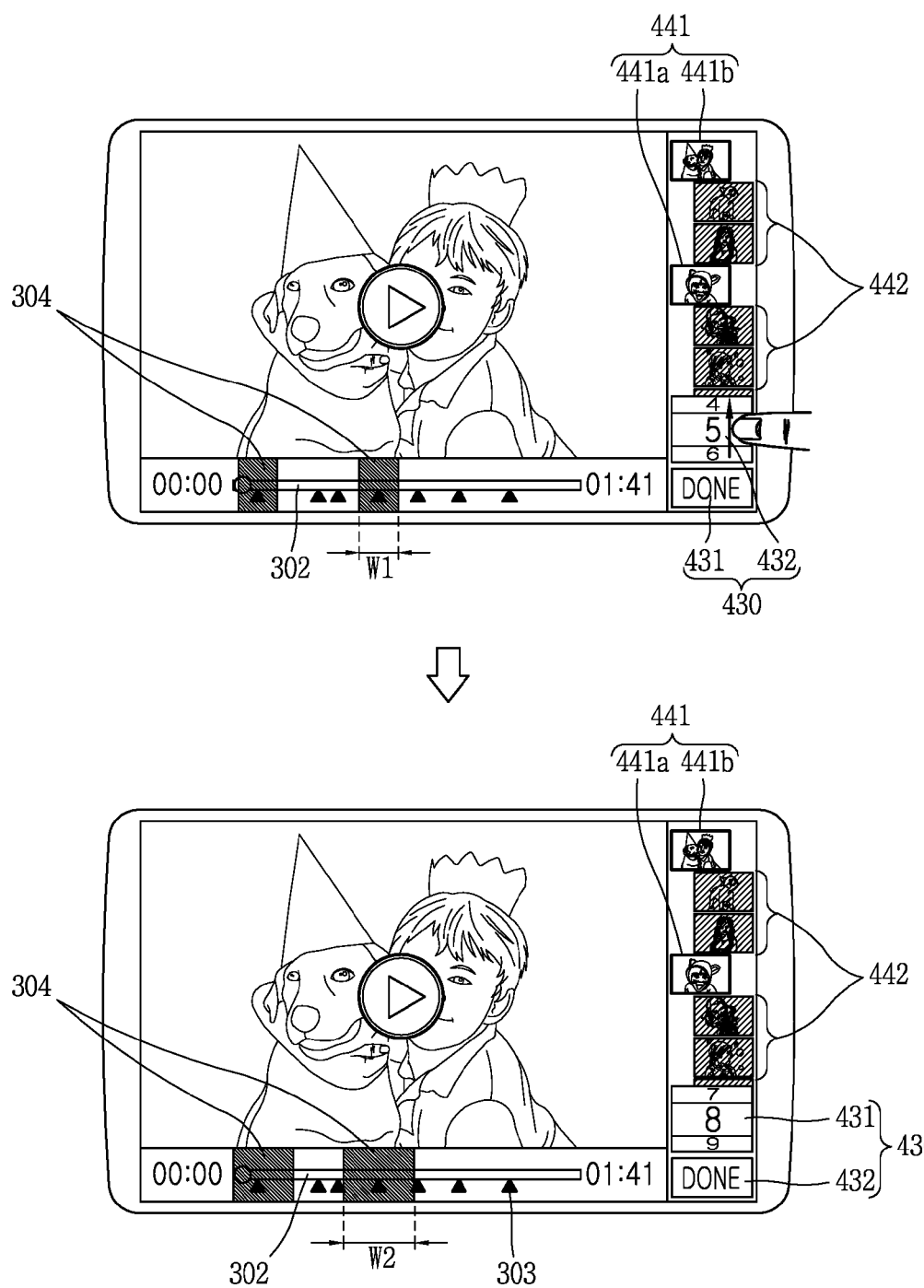

Hereinafter, a control method of adjusting the reproduction duration will be described with reference to FIG. 8C. In particular, the display unit 151 can output partial reproduction images 304 corresponding to the selected first and second thumbnail images 441a and 441b. The partial reproduction images 304 corresponding to the first and second thumbnail images 441 and 441b, respectively, may have substantially the same reproduction duration. To notify the reproduction duration, the partial reproduction image 304 can be displayed to have a first width W1 in an extending direction of the progress bar 302.

When the reproduction duration extends in response to a touch applied to the first control icon 431, the controller 180 can change the width of the partial reproduction image 304 into a second width W2 wider than the first width W1. Here, the partial reproduction images 304 corresponding to the first and second thumbnail images 441a and 441b, respectively, which are stored in the associated state, may also change. However, the present invention is not limited to this. In accordance with this embodiment, the user can easily change a reproduction duration of a frame including images and set the same time for associated images.

Figure 8D:
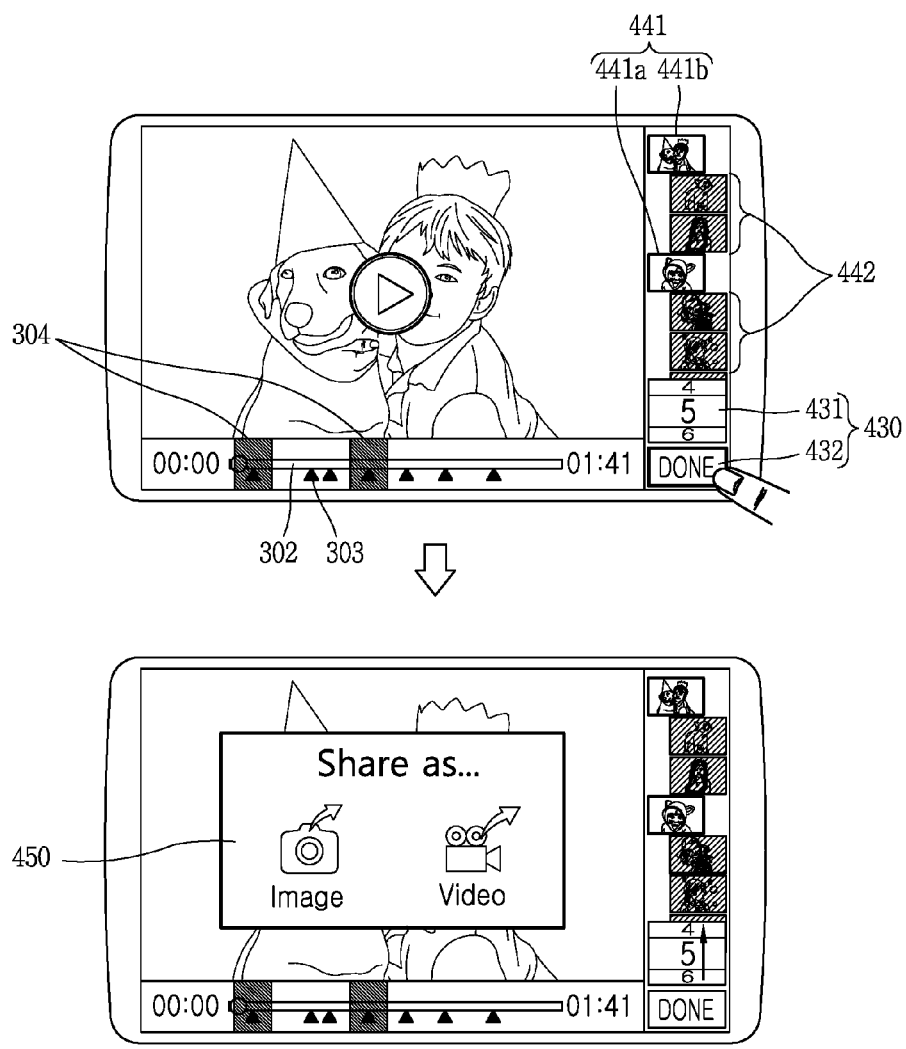

Referring to FIG. 8D, after selecting the thumbnail images and setting the reproduction duration, when a touch is applied to the second control icon 432, the controller 180 can display a share window 450 for sharing the set images and the like. The share window 450 may be displayed as a popup window, and include a plurality of icons for receiving touches for selecting data to share. This allows the user to edit data to share while checking a plurality of thumbnail images.

Figure 9A:
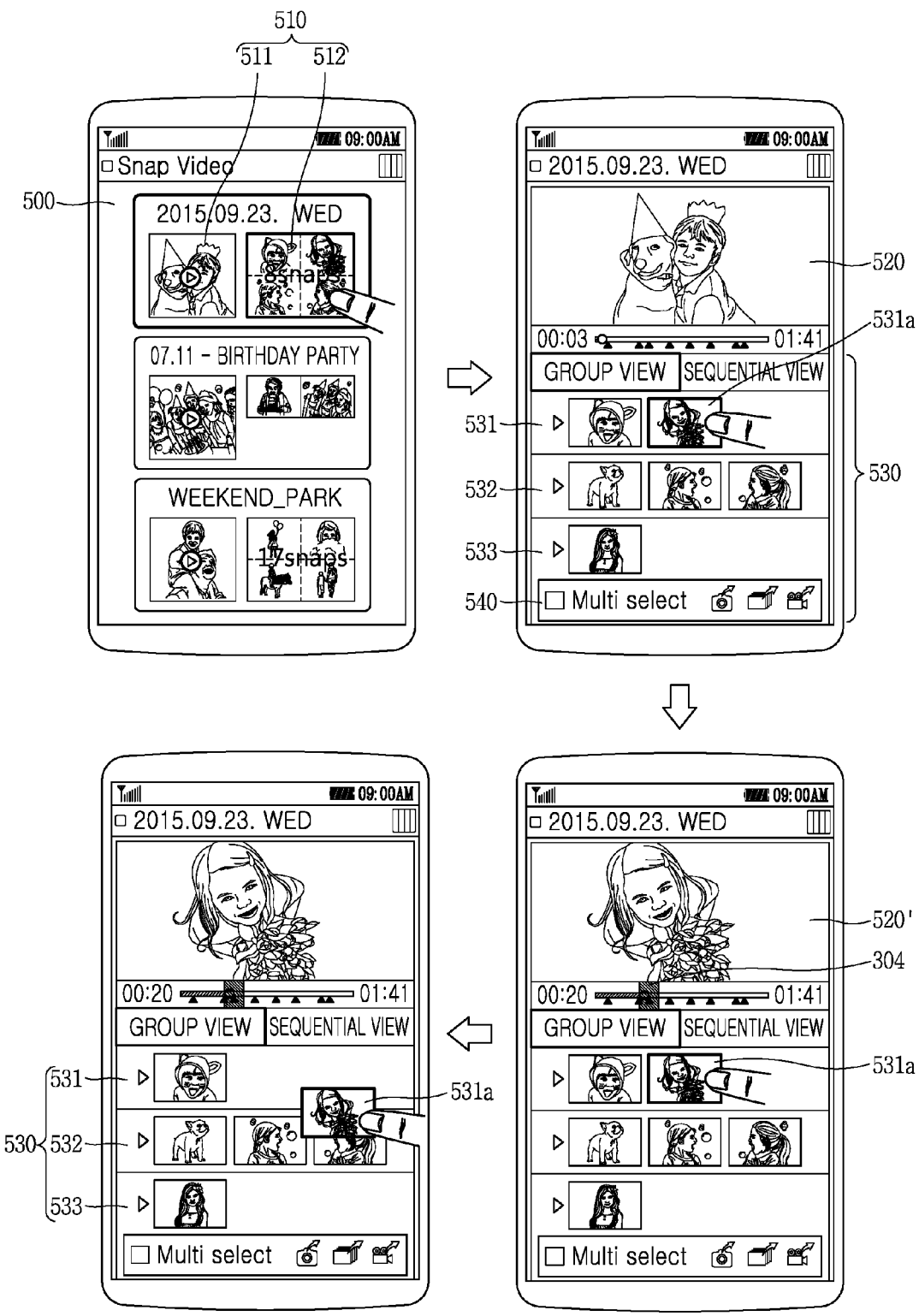
FIGS. 9A to 9C are conceptual views illustrating a control method of providing stored video file and images.
Figure 9B:
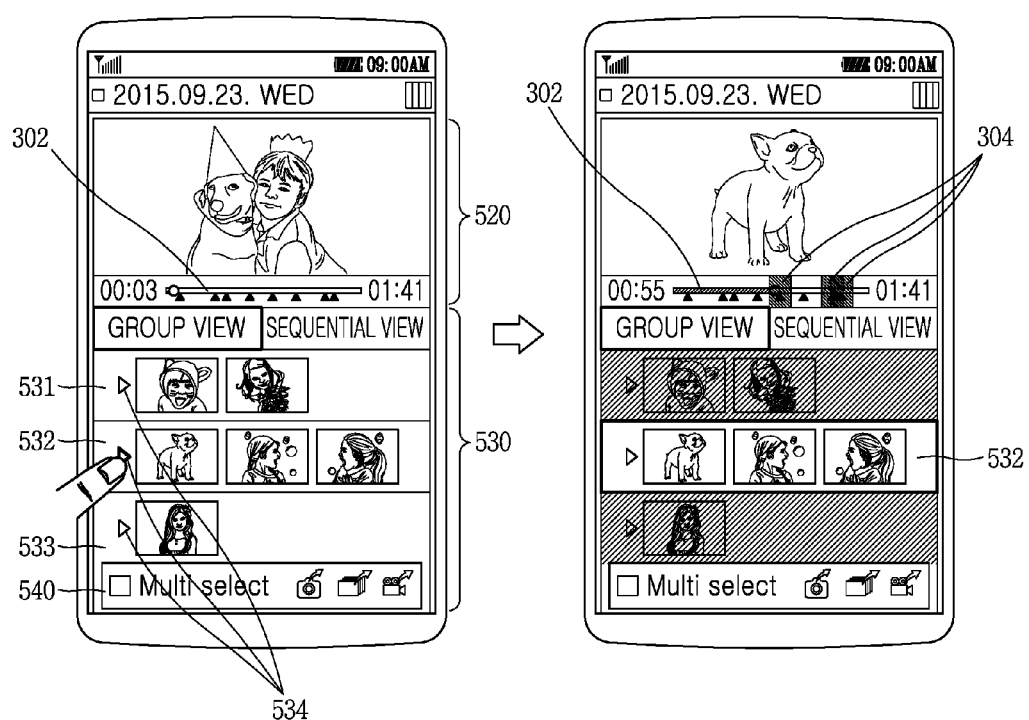
Figure 9C:
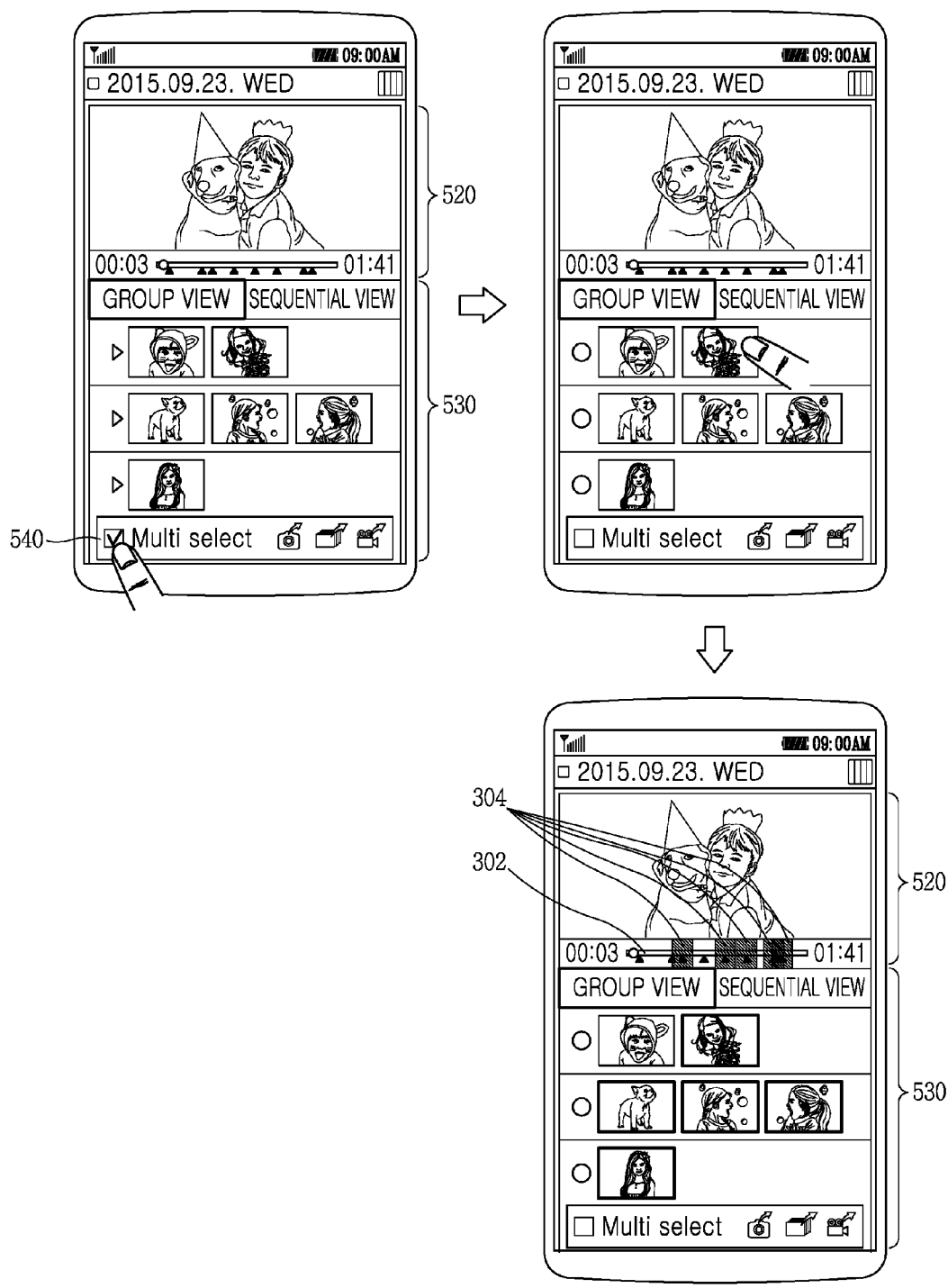

Next, FIGS. 9A to 9C are conceptual views illustrating a control method of providing stored video file and images. As illustrated in FIG. 9A, the controller 180 can display a graphic image 510, which includes a video file 511 and images stored together, on an execution screen 500 when a specific application is executed. The graphic image 510 may also include dates at which the video file and the images are generated, and images indicating the video file 511 and the images 512.

The controller 180 can then display screen information including the video file 511 and the images 512, in response to a touch applied to the graphic image 510. The display unit 151 can also display a preview screen formed by an image included in the video file 511 on a first region 520, and images stored along with the video file 511 on a second region 530.

In addition, the second region 530 can output a plurality of associated stored images in a discriminating manner. That is, the second region 530 can be divided into first to third category regions 531, 532 and 533. Thumbnail images of associated images can be output on each category region. Also, the screen information may further include a control window 540 for sharing the video file and the images.

When one thumbnail image 531a is selected on the second region 530, the controller 180 can display an image 520' corresponding to the selected thumbnail image 531a on the preview screen. Also, a partial reproduction image 304 corresponding to the thumbnail image 531a can be output on a progress bar. This allows the user to recognize at which time point each image has been stored, even when associated images are output.

In addition, the controller 180 can change a category in response to a continuous touch input applied to the thumbnail image 531a. That is, the controller 180 can move the thumbnail image 531a from the first category region 531 to the second category region 532, in response to a drag touch input applied to the thumbnail image 531a. Accordingly, the user can easily change the associated state of the images while the images are output for each category.

Referring to FIG. 9B, the display unit 151 can display a select icon 534 on each category region. The controller 180 can then select a plurality of images associated with one another, in response to a touch applied to the select icon 533. For example, a plurality of images included in the second category region 532 can be selected and partial reproduction images 304 corresponding to the selected images can be output. In more detail, the controller 180 can share images included in the selected one category region, and this allows the user to easily select the plurality of associated images.

Referring to FIG. 9C, the controller 180 can select a plurality of images, irrespective of categories, in response to a touch applied to the control window 540. In particular, the control window 540 can include an icon for selecting a plurality of images in an individual manner. After selection of the icon, images can be selected in response to touches applied to the thumbnail images.

The display unit 151 can also sequentially output partial reproduction images 304 corresponding to the images, which are selected in response to the touches on the progress bar 302. In accordance with this embodiment, the user can immediately change and store a preview image obtained by the camera in real time.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a touch screen configured to continuously display images captured by the camera;
a memory; and
a controller configured to:
in response to a first touch applied to the touch screen continuously displaying the images at a first touch-applied time point, store a first image displayed on the touch screen at the first touch-applied time point in the memory,
display a first thumbnail image corresponding to the first image on the touch screen,
in response to a second touch applied to a specific area of the touch screen continuously displaying the images and the first thumbnail image at a second touch-applied time point, store a second image displayed on the touch screen at the second touch-applied time point in the memory, by grouping the second image with the first image in the memory,
store the first and second images in the memory when the specific area of the touch screen displays the first thumbnail image, and
change the first thumbnail image into a second thumbnail image corresponding to the second image, in response to the touch applied to the first thumbnail image.

2. The mobile terminal of claim 1, wherein the second thumbnail image includes visual information indicating a number of grouped images.

3. The mobile terminal of claim 1, wherein the controller is further configured to in response to a multi-touch input applied to the first and second thumbnail images displayed on the touch screen, store the first image with an image displayed on the touch screen while the multi-touch is applied and store the second image with the image displayed on the touch screen while the multi-touch is applied.

4. The mobile terminal of claim 1, further comprising:
a sensor configured to sense a posture of the mobile terminal,
wherein the first touch is applied to the touch screen with the mobile terminal being in a first posture and the second touch is applied to the touch screen with the mobile terminal in a second posture, and
wherein the controller is further configured to group the second image with the first image in response to a third touch applied to the touch screen when the mobile terminal is returned to the first position from the second position.

5. The mobile terminal of claim 1, wherein the controller is further configured to:
display a guide image indicating a detected subject on the images displayed on the touch screen, and
store captured images in the memory by grouping the stored images, in response to a touch applied to the guide image.

6. The mobile terminal of claim 5, wherein the subject corresponds to a person.

7. The mobile terminal of claim 5, wherein the controller is further configured to capture an image with the subject in focus, in response to the touch applied to the guide image.

8. The mobile terminal of claim 5, wherein the controller is further configured to:
display an icon on the touch screen for storing images during video capturing,
select the subject, in response to a specific touch input applied to the guide image, and
store the captured image in the memory by grouping the captured image with prestored images related to the subject in response to a touch applied to the icon.

9. The mobile terminal of claim 1, wherein the controller is further configured to:
display an icon on the touch screen for storing an image during video capturing, and
store images in the memory at an interval of a specific period of time in response to a touch applied to the icon for the specific period of time.

10. The mobile terminal of claim 9, wherein the controller is further configured to:
display a guide image on the touch screen indicating a detected subject on the images displayed on the touch screen, and
store and group a plurality of images captured at a specific time interval in the memory in response to the touch applied to the icon for the specific period of time after the guide image is selected.

11. The mobile terminal of claim 9, wherein the controller is further configured to:
display a plurality of thumbnail images on the touch screen, and
store images corresponding to the respective thumbnail images by grouping the images captured at the specific time interval.

12. The mobile terminal of claim 1, wherein the controller is further configured to display the first or the second image in full screen on the touch screen in response to a touch input being applied to the first and second thumbnail images, respectively.

13. The mobile terminal of claim 1, wherein the controller is further configured to:
generate a video file using the continuously-captured images when video capturing is terminated,
display a progress bar of the video file on the touch screen, and a plurality of thumbnail images corresponding to the plurality of captured images, and
display storage points indicating stored time points of the plurality of images, respectively, on the progress bar.

14. The mobile terminal of claim 13, wherein the controller is further configured to:
in response to one of the plurality of thumbnail images being selected, select another thumbnail image grouped with the selected thumbnail image, and
transform the selected thumbnail image.

15. The mobile terminal of claim 14, wherein the controller is further configured to display on the progress bar a partial reproduction image indicating a reproduction duration of a video reproduction frame including the plurality of images in response to the one thumbnail image being selected.

16. The mobile terminal of claim 13, wherein the controller is further configured to:
arrange the plurality of thumbnail images in one direction on the touch screen, and
display at least one grouped thumbnail image by moving the at least one grouped thumbnail in response to a touch applied to the one thumbnail image.

17. The mobile terminal of claim 16, wherein the controller is further configured to group an image corresponding to the thumbnail image with other images or release the grouping of the image corresponding to the thumbnail image, in response to a specific touch input applied to the one thumbnail image.

18. The mobile terminal .of claim 15, wherein the controller is further configured to display a share window for sharing at least part of grouped images and the video file with a specific server or a specific external device.

19. The mobile terminal of claim 1, wherein the controller is further configured to display grouped images on a plurality of category regions, the category regions being discriminated from each other, in response to the video capturing being terminated.

20. A method of controlling a mobile terminal, the method comprising:
continuously displaying images captured by a camera on a touch screen of the mobile terminal;
in response to a first touch applied to the touch screen continuously displaying the images at a first touch-applied time point, storing a first image displayed on the touch screen at the first touch-applied time point in a memory;
displaying a first thumbnail image corresponding to the first image on the touch screen;
in response to a second touch applied to a specific area of the touch screen continuously displaying the images and the first thumbnail image at a second touch-applied time point, storing a second image displayed on the touch screen at the second touch-applied time point in the memory, by grouping the second image with the first image in the memory;

storing the first and second images in the memory when the specific area of the touch screen displays the first thumbnail image; and changing the first thumbnail image into a second thumbnail image corresponding to the second image, in response to the touch applied to the first thumbnail image.

* * * * *